(12) United States Patent
Centonza et al.

(10) Patent No.: US 11,044,643 B2
(45) Date of Patent: Jun. 22, 2021

(54) 5G QOS FLOW TO RADIO BEARER REMAPPING

(71) Applicant: TELEFONAKTIEBOLAGET LM ERICSSON (PUBL), Stockholm (SE)

(72) Inventors: Angelo Centonza, Stockholm (SE); Jari Vikberg, Järna (SE); Alexander Vesely, Feldbach (AT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/477,765

(22) PCT Filed: Jan. 11, 2018

(86) PCT No.: PCT/IB2018/050181
§ 371 (c)(1),
(2) Date: Jul. 12, 2019

(87) PCT Pub. No.: WO2018/130968
PCT Pub. Date: Jul. 19, 2018

(65) Prior Publication Data
US 2020/0128452 A1    Apr. 23, 2020

Related U.S. Application Data

(60) Provisional application No. 62/444,966, filed on Jan. 11, 2017.

(51) Int. Cl.
*H04W 36/00* (2009.01)
*H04W 28/02* (2009.01)
*H04W 80/08* (2009.01)

(52) U.S. Cl.
CPC ... *H04W 36/0055* (2013.01); *H04W 28/0263* (2013.01); *H04W 28/0268* (2013.01);
(Continued)

(58) Field of Classification Search
CPC ........ H04W 36/0044; H04W 28/0263; H04W 28/0268; H04W 36/00; H04W 36/08;
(Continued)

(56) References Cited

U.S. PATENT DOCUMENTS

2018/0083688 A1*  3/2018  Agiwal ............... H04W 12/033
2018/0376384 A1* 12/2018  Youn ..................... H04W 36/14
(Continued)

FOREIGN PATENT DOCUMENTS

RU      2600456 C1    10/2016
WO   2015002404 A1     1/2015

OTHER PUBLICATIONS

Xu et al. U.S. Appl. No. 62/442,887, filed Jan. 5, 2017 (Year: 2017).*
(Continued)

*Primary Examiner* — Wutchung Chu

(57) ABSTRACT

According to some embodiments, a method for use in a network node of performing handover of a wireless device comprises: receiving a handover request from a source network node; receiving, from the source network node, a quality of service (QoS) flow to data radio bearer (DRB) mapping that was used by the source network node prior to the handover; receiving buffered Packet Data Convergence Protocol (PDCP) protocol data units (PDUs) from the source network node; transmitting the received PDCP PDUs using the received QoS flow to DRB mapping; obtaining an indication that handover is complete; determining a new QoS flow to DRB mapping; and activating the new QoS flow to DRB mapping for transmission of PDCP PDUs. Particular embodiments may include sending the new QoS flow to DRB mapping to the source network node, and/or receiving PDCP status reporting from the wireless device.

14 Claims, 22 Drawing Sheets

(52) U.S. Cl.
CPC ... *H04W 36/0044* (2013.01); *H04W 36/0058* (2018.08); *H04W 36/0069* (2018.08); *H04W 80/08* (2013.01)

(58) Field of Classification Search
CPC ..... H04W 36/14; H04W 36/30; H04W 80/08; H04W 36/0055
See application file for complete search history.

(56) References Cited

U.S. PATENT DOCUMENTS

| | | | | |
|---|---|---|---|---|
| 2019/0327658 | A1* | 10/2019 | Han | H04W 40/36 |
| 2019/0357075 | A1* | 11/2019 | Van Der Velde | H04W 28/0268 |
| 2019/0357093 | A1* | 11/2019 | Xu | H04W 36/08 |
| 2020/0029241 | A1* | 1/2020 | Maeder | H04W 28/0263 |

OTHER PUBLICATIONS

Xu et al. U.S. Appl. No. 62/442,483, filed Jan. 5, 2017 (Year: 2017).*

3GPP TS 36.300 V14.1.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), Dec. 2016.

Huawei, QoS considerations in Handover procedure, R3-162958, 3GPP TSG-RAN3 Meeting #94, Reno, Nevada, USA, Nov. 14-18, 2016.

3rd Generation Partnership Project; Technical Specification Group Radio Access Network; Study on New Radio Access Technology; Radio Access Architecture and Interfaces (Release 14), 3GPP TR 38.801 V1.0.0, Dec. 2016.

Catt, Reconfiguration for the mapping of QoS flow and RB, R2-1700200, 3GPP TSG RAN WG2 Meeting Ad Hoc, Spokane, USA, Jan. 17-19, 2017.

Huawei, et al., A New Protocol Layer for QoS Flow to DRB Mapping, R2-1700088, 3GPP TSG-RAN2 Meeting Ad Hoc, Spokane, Washington, USA, Jan. 17-19, 2017.

Huawei, Data Forwarding for QoS Flow Remapping During Mobility, R3-171810, 3GPP TSG-RAN WG3 #96, Hangzhou, P.R. China, May 15-19, 2017.

* cited by examiner

5G QOS FLOW TO RADIO BEARER REMAPPING

This application is a 371 of International Application No. PCT/IB2018/050181, filed Jan. 11, 2018, which claims the benefit of U.S. Application No. 62/444,966, filed Jan. 11, 2017, the disclosures of which are fully incorporated herein by reference.

TECHNICAL FIELD

Particular embodiments are directed to wireless communications and, more particularly, to Third Generation Partnership Project (3GPP) fifth generation (5G) quality of service (QoS) flow to data radio bearer (DRB) mapping.

INTRODUCTION

Third Generation Partnership Project (3GPP) specifies fifth generation (5G) wireless network standardization that includes quality of service (QoS) flow to data radio bearer (DRB) mapping. Also described herein is background related to evolved packet system (EPS) (i.e., long term evolution (LTE)/evolved universal terrestrial access network (E-UTRAN)) and evolved packet core (EPC) because some 5G concepts may be based on EPC concepts, EPS related architecture aspects, Inter-eNB handover, and LTE Dual Connectivity (DC).

3GPP TS 23.799 v14.0.0 includes specifications for a new radio interface referred to as NR (or 5G or G-UTRA) and a next generation packet core network (NG-CN or NGC). An example is illustrated in FIG. 1.

FIG. 1 is a block diagram illustrating a high level architecture of a next generation network. FIG. 1 is reproduced from FIG. 4.2.1-1 of 3GPP TS 23.799. The illustrated examples includes a next generation user equipment (UE) (10), next generation radio access network (RAN) (20), next generation core (30), data network (40), and their reference points (i.e., NG1, NG2, NG3, and NG6).

The NG2 reference point is for the control plane between next generation RAN (20) and next generation core (30). The NG3 reference point is for the user plane between next generation RAN (20) and next generation core (30). The NG1 reference point (see FIG. 4) is for the control plane between next generation UE (10) and next generation core (30). The NG6 reference point is for communication between the next generation core (30) and data network (40). Data network (40) may comprise an operator external public or private data network or an intra-operator data network (e.g., for provision of IP multimedia subsystem (IMS) services). N6 corresponds to SGi for 3GPP accesses.

The next generation RAN includes base stations that support evolved LTE and/or NR radio access. An example is illustrated in FIG. 2.

FIG. 2 is a block diagram illustrating the new RAN architecture from 3GPP TR 38.801 V1.0.0. The new RAN includes of the following two logical nodes. A gNB provides the NR U-plane and C-plane protocol terminations towards the UE. An eLTE eNB provides the E-UTRA U-plane and C-plane protocol terminations towards the UE.

The logical nodes in new RAN are interconnected with each other by the Xn interface (which may be specified as an evolution of the X2 interface). The logical nodes in new RAN are connected to the NGC by the NG interface (also referred to as NG2 for the control plane interface between new RAN and NGC and NG3 for the user plane between new RAN and NGC). The NG interface supports a many-to-many relation between NG-CP/UPGWs and the logical nodes in new RAN.

FIG. 3 is a block diagram illustrating the new RAN protocol architecture. The protocol layers include the Packet Data Convergence Protocol (PDCP), Radio Link Control (RLC) protocol, and the Medium Access Control (MAC) protocol.

FIG. 4 is a block diagram illustrating the 5G overall system architecture. FIG. 4 is reproduced from FIG. 8.12.2-2 from 3GPP TS 23.799 v14.0.0, and the various functions of the illustrated nodes are further described therein.

The expanded connectivity use cases provided by 5G networks, such as enhanced mobile broadband (eMBB), massive machine type communication (MTC) and ultra low latency and reliable communication (ULLRC), includes service differentiation requirements on the quality of service (QoS) framework to provide a prioritized and predictable behavior for the connectivity service. The 5G QoS framework includes limitations related to the limited number of simultaneously active radio bearers and an improved description of the treatment of the data over the connectivity network. Moreover, 5G includes a clearer separation of concerns between the service classification and treatment description in the core network and enforcing the treatment to fulfill the QoS targets in the RAN. The requirements include a QoS framework based on a protocol data unit (PDU) flow QoS model and abandon the one-to-one relation between evolved packet system (EPS) bearers and data radio bearers (DRB s).

A PDU session is defined as an association between a UE and a data network that provides a PDU connectivity service. The type of the association includes IP type, Ethernet type and non-IP type. Each PDU session is associated with a single NG3 interface. When the same PDU session is connected to multiple local/data networks that also require NG9 interface connection, there will be single NG3 and NG9 instances per PDU session.

The 5G QoS model supports a QoS flow-based framework. The 5G QoS model supports both QoS flows that require guaranteed flow bit rate and QoS flows that do not require guaranteed flow bit rate. A 5G QoS flow is the finest granularity of PDU stream that can be differentiated for QoS forwarding treatment in the system. User plane traffic with the same user plane (NG3) marking value within a PDU session correspond to a 5G QoS flow. User plane marking for QoS is carried in encapsulation header on NG3 (i.e., without any changes to the end-to-end (e2e) packet header. The encapsulation header can be applied to PDUs with different types of payload (i.e., IP packets, non-IP PDUs, and Ethernet frames).

Two types of QoS marking include A-type QoS marking and B-type QoS marking: A-type QoS marking is user plane marking sent over NG3 (5G QoS Flow ID (5QI)) with standardized 5G QoS characteristics. B-type QoS marking is user plane marking sent over NG3 (5QI) with 5G QoS characteristics dynamically signaled over NG2 from NG CN to NG RAN.

A QoS profile consists of user plane marking (5QI) and corresponding 5G QoS characteristics. A QoS rule consists of QoS profile, packet filters and precedence order. A QoS profile of QoS rules (including pre-authorized ones) are provided to the (R)AN over NG2, provided at PDU session establishment and every time the UE switches from idle to connected mode, for the PDU sessions that are selectively re-activated.

The network may provide a default QoS rule to the UE at PDU session establishment. In addition, pre-authorized QoS rules may be provided to the UE. The network may also indicate whether reflective QoS applies on a 5G QoS flow on 5QIs with B-type value range.

The following characteristics apply for processing of downlink traffic. A core user plane function (UPF) maps service data flow (SDF) to QoS flows. The core UPF performs per PDU session aggregate maximum bit rate (AMBR) enforcement and also performs counting for support of charging. The core UPF transmits the PDUs of the PDU session in a single tunnel, and includes user plane marking (5QI) in the encapsulation header. In addition, the core UPF may include an indication for reflective QoS activation in the encapsulation header. The (R)AN maps PDUs from 5G QoS flows to access-specific resources based on the 5QI and the corresponding QoS characteristics, also taking into account the NG3 tunnel associated with the downlink packet. Packet filters are not used for binding of 5G QoS flows onto access-specific resources in (R)AN. If reflective QoS applies, a UE creates a new derived QoS rule. The packet filter in the derived QoS rule is derived from the downlink packet (i.e. the header of the downlink packet).

Following characteristics apply for processing of Uplink traffic. A UE uses the stored QoS rules to determine a mapping between SDFs and 5G QoS flow, and between the 5G QoS flow and access specific resource. The UE transmits the uplink PDUs using the corresponding access specific resource determined by the QoS rule. The (R)AN transmits the PDUs over N3 tunnel towards the core UPF. When passing an uplink packet from (R)AN to CN, the (R)AN determines the 5QI and selects the N3 tunnel based on information received from the Access Stratum (AS). The UPF performs per PDU session AMBR enforcement and counting of packets for charging.

Per PDU session AMBR may be enforced in the core UPF. For PDU sessions with more than one NG6 interface (uplink CL PDU session, Multi-homed PDU session), AMBR is enforced in the core UPF that supports the uplink CL or branching point functionality. The (R)AN may enforce a maximum bit rate (MBR) limit in uplink and downlink per UE for flows that do not require guaranteed flow bit rate. The UE performs uplink rate limitation on a PDU session basis for non-guaranteed bit rate (non-GBR) traffic and on 5G QoS flow basis for guaranteed bit rate (GBR) traffic.

Rate limit enforcement per PDU session applies for flows that do not require GBR. MBR per SDF is mandatory for GBR flows but optional for non-GBR flows. It is enforced in the UPF.

Evolved Packet System (EPS) is the evolved 3GPP packet switched domain and consists of evolved packet core (EPC) and evolved universal terrestrial radio access network (E-UTRAN). An example is illustrated in FIG. 5.

FIG. 5 is a block diagram illustrating an overview of an evolved packet core (EPC) architecture. More specifically, the illustrated example is a non-roaming architecture for 3GPP accesses. A detailed description of the PGW (PDN Gateway), SGW (Serving Gateway), PCRF (Policy and Charging Rules Function), MME (Mobility Management Entity) and mobile device (UE) may be found in 3GPP TS 23.401. The LTE radio access, E-UTRAN, consists of one more eNBs.

FIG. 6 is a block diagram illustrating an example E-UTRAN architecture. The components of FIG. 6 are described in detail in 3GPP TS 36.300. The E-UTRAN consists of eNB that provide the E-UTRA user plane (PDCP/RLC/MAC/PHY) and control plane (RRC in addition to the user plane protocols) protocol terminations towards the UE. The eNBs are interconnected with each other by means of the X2 interface. The eNBs are also connected by means of the S1 interface to the EPC (Evolved Packet Core), more specifically to the MME (Mobility Management Entity) by means of the S1-MME interface and to the Serving Gateway (S-GW) by means of the S1-U interface. The main parts of the EPC Control Plane (CP) and User Plane (UP) architectures are shown in FIGS. 7 and 8.

FIG. 7 is a block diagram illustrating the EPC control plane protocol architecture. The illustrated example includes the control plane protocol stacks at the UE, eNB, MME, S-GW, and PDN-GW.

FIG. 8 is a block diagram illustrating the EPC user plane protocol architecture. The illustrated example includes the user plane protocol stacks at the UE, eNB, S-GW, and PDN-GW.

FIG. 9 is a block diagram illustrating the X2 interface protocol structure. The X2 interface structure is described in detail in 3GPP TS 36.420 V13.0.0.

FIGS. 10A and 10B are a flow diagram illustrating the signaling flow for inter-eNB handover. In the illustrated example, the MME and the serving gateway are not changed during the handover. The signaling flow is described in more detail in 3GPP TS 36.300 v14.1.0.

Steps 4-8 are particularly relevant for the embodiments described below in the Detailed Description. The handover is triggered by the source eNB sending a HANDOVER REQUEST message to the target eNB passing necessary information to prepare the handover (HO) at the target side (step 4). The passed information includes QoS profiles of the E-RABs on the source eNB side (and additional information). The target eNB configures the required resources according to the received E-RAB QoS information (step 5).

In step 6, the target eNB prepares HO with L1/L2 and sends the HANDOVER REQUEST ACKNOWLEDGE to the source eNB. The HANDOVER REQUEST ACKNOWLEDGE message includes a transparent container to be sent to the UE as an RRC message to perform the handover. The HANDOVER REQUEST ACKNOWLEDGE message may also include RNL/TNL information for user plane data forwarding tunnels.

After the HANDOVER REQUEST ACKNOWLEDGE message is received on the source eNB side, user plane data forwarding may be initiated towards the target eNB. The target eNB generated the RRC message to perform the handover (i.e., RRCConnectionReconfiguration message including the mobilityControlInformation) to be sent by the source eNB towards the UE (step 7). The UE receives the RRCConnectionReconfiguration message with necessary parameters and is commanded by the source eNB to perform the HO.

In step 8, the source eNB sends the SN STATUS TRANSFER message to the target eNB to convey the uplink PDCP sequence number (SN) receiver status and the downlink PDCP SN transmitter status of E-RABs for which PDCP status preservation applies (i.e., for RLC AM). The uplink PDCP SN receiver status includes at least the PDCP SN of the first missing uplink service data unit (SDU) and may include a bit map of the receive status of the out of sequence uplink SDUs that the UE needs to retransmit in the target cell, if there are any such SDUs. The downlink PDCP SN transmitter status indicates the next PDCP SN that the target eNB will assign to new SDUs that do not yet have a PDCP SN.

Data forwarding between source eNB and target eNB is based on the following principles. U-plane tunnels can be established between the source eNB and the target eNB during handover preparation as described above. One tunnel may be established for uplink data forwarding and another one for downlink data forwarding for each E-RAB for which data forwarding is applied. User data can be forwarded from the source eNB to the target eNB during handover execution. Forwarding of downlink user data from the source to the target eNB takes place for as long as packets are received at the source eNB from the EPC or the source eNB buffer has not been emptied.

After the handover is completed, the target eNB sends a PATH SWITCH message to the MME to inform the MME that the UE has gained access and the MME sends a MODIFY BEARER REQUEST message to the Serving Gateway. The U-plane path is switched by the Serving Gateway from the source eNB to the target eNB. The source eNB continues forwarding of U-plane data as long as packets are received at the source eNB from the Serving Gateway or the source eNB buffer has not been emptied. The Serving Gateway can also send an "End Marker" towards the source eNB to indicate that no more downlink U-plane data will be sent towards the source eNB. The "End Marker" can also be forwarded from the source eNB to the target eNB to trigger release of the user plane tunnels for data forwarding.

User plane data forwarding is used for RLC-AM (Acknowledged Mode) bearers. In the case when Full (AS) Configuration is not performed at the target eNB side, the following principles apply.

For in-sequence delivery and duplication avoidance, PDCP SN is maintained on a bearer basis and the source eNB informs the target eNB about the next downlink PDCP SN to allocate to a packet that does not have a PDCP sequence number yet (either from source eNB or from the Serving Gateway).

For security synchronization, the hyper-frame number (HFN) is also maintained and the source eNB provides to the target one reference HFN for the uplink and one for the downlink (i.e., HFN and corresponding SN).

In both the UE and the target eNB, a window-based mechanism is needed for duplication detection.

The occurrence of duplicates over the air interface in the target eNB is minimized by means of PDCP SN based reporting at the target eNB by the UE. In uplink, the reporting is optionally configured on a bearer basis by the eNB and the UE starts by transmitting those reports when granted resources in the target eNB. In downlink, the eNB is free to decide when and for which bearers a report is sent, and the UE does not wait for the report to resume uplink transmission.

The target eNB re-transmits and prioritizes all downlink PDCP SDUs forwarded by the source eNB (i.e., the target eNB sends data with PDCP SNs from X2 before sending data from S1), with the exception of PDCP SDUs of which the reception was acknowledged through PDCP SN based reporting by the UE.

The UE re-transmits in the target eNB all uplink PDCP SDUs starting from the first PDCP SDU following the last consecutively confirmed PDCP SDU (i.e., the oldest PDCP SDU that has not been acknowledged at RLC in the source) excluding the PDCP SDUs of which the reception was acknowledged through PDCP SN based reporting by the target.

Upon handover, the source eNB forwards to the Serving Gateway the uplink PDCP SDUs successfully received in-sequence until the sending of the Status Transfer message to the target eNB. At that point the source eNB stops delivering uplink PDCP SDUs to the S-GW and discards any remaining uplink RLC PDUs. Then the source eNB may either discard the uplink PDCP SDUs received out of sequence if uplink data forwarding was not activated or forward the uplink PDCP SDUs to the target eNB in case uplink data forwarding was activated.

LTE includes a feature referred to as dual connectivity (DC). LTE DC is a 3GPP Release 12 standardized solution that supports UEs connecting to multiple carriers to send and/or receive data on multiple carriers at the same time. More details can be found in 3GPP TS 36.300.

E-UTRAN supports DC operation whereby a multiple Rx/Tx UE in RRC_CONNECTED is configured to use radio resources provided by two distinct schedulers located in two eNBs connected via a non-ideal backhaul over the X2 interface (see TR 36.842 and TR 36.932). The overall E-UTRAN architecture described with respect to FIG. 6 also applies for DC. eNBs involved in DC for a certain UE may assume two different roles. An eNB may either act as a master eNB (MeNB) or as a secondary eNB (SeNB). In DC a UE is connected to one MeNB and one SeNB.

The radio protocol architecture that a particular bearer uses depends on how the bearer is setup. Three bearer types exist: MCG bearer, SCG bearer, and split bearer. An example is illustrated in FIG. 11.

FIG. 11 illustrates a radio protocol architecture for dual connectivity (DC). The illustrated example includes the three bearer types (i.e., MCG bearer, SCG bearer, and split bearer). RRC is located in MeNB. SRBs are configured as MCG bearer type and therefore only use the radio resources of the MeNB. DC can also be described as having at least one bearer configured to use radio resources provided by the SeNB.

Inter-eNB control plane signalling for DC is performed by X2 interface signalling. Control plane signalling towards the MME is performed by S1 interface signalling.

Only one S1-MME connection exists per DC UE between the MeNB and the MME. Each eNB handles UEs independently (i.e., provide the PCell to some UEs while providing SCell(s) for SCG to others). Each eNB involved in DC for a certain UE controls its radio resources and is primarily responsible for allocating radio resources of its cells. Respective coordination between MeNB and SeNB is performed by X2 interface signalling.

FIG. 12 illustrates control plane connectivity of eNBs involved in DC for a particular UE. The S1-MME is terminated in MeNB. The MeNB and the SeNB are interconnected via X2-C.

Dual connectivity includes two different user plane architectures. In one architecture the S1-U only terminates in the MeNB and the user plane data is transferred from MeNB to SeNB using the X2-U. In a second architecture the S1-U terminates in the SeNB.

FIG. 13 illustrates user plane connectivity options of eNBs involved in DC for a particular UE. Different bearer options can be configured with different user plane architectures. U-plane connectivity depends on the bearer option configured:

For MCG bearers, the S1-U connection for the corresponding bearer(s) to the S-GW is terminated in the MeNB. The SeNB is not involved in the transport of user plane data for this type of bearer(s) over the Uu.

For split bearers, the S1-U connection to the S-GW is terminated in the MeNB. PDCP data is transferred between the MeNB and the SeNB via X2-U. The SeNB and MeNB are involved in transmitting data of this bearer type over the Uu.

For SCG bearers, the SeNB is directly connected with the S-GW via S1-U. The MeNB is not involved in the transport of user plane data for this type of bearer(s) over the Uu.

If only MCG and split bearers are configured, the SeNB does not have a S1-U termination.

The SeNB Addition procedure is initiated by the MeNB and establishes a UE context at the SeNB to provide radio resources from the SeNB to the UE. The procedure is used to add at least the first cell (PSCell) of the SCG.

FIG. 14 is a flow diagram illustrating the SeNB Addition procedure. Steps 7 and 8 (i.e., SN status transfer and data forwarding) are the same as described in relation to the inter-eNB handover signalling flow in FIG. 10A.

SUMMARY

Particular embodiments include a mechanism for 5G-QoS-flow-to-DRB remapping in relation to, for example, handover between gNBs. The embodiments described herein facilitate a target RAN node in a mobility procedure to receive user data from a source RAN node and to deliver such data in a way that lost packets can be recovered. The embodiments also facilitate the target node reusing the same configuration that the source node used for mapping data flows to DRBs.

According to some embodiments, a method for use in a network node of performing handover of a wireless device comprises: receiving a handover request from a source network node; receiving, from the source network node, a quality of service (QoS) flow to data radio bearer (DRB) mapping that was used by the source network node prior to the handover; receiving buffered Packet Data Convergence Protocol (PDCP) protocol data units (PDUs) from the source network node; transmitting the received PDCP PDUs using the received QoS flow to DRB mapping; obtaining an indication that handover is complete; determining a new QoS flow to DRB mapping; and activating the new QoS flow to DRB mapping for transmission of PDCP PDUs.

In particular embodiments, receiving the QoS flow to DRB mapping from the source network node comprises receiving handover signaling on an Xn interface or receiving handover signaling via a core network element on an S1 or NG interface.

In particular embodiments, the method further comprises sending the new QoS flow to DRB mapping to the source network node. The method may include receiving PDCP status reporting from the wireless device. The new QoS flow to DRB mapping for transmission of PDCP PDUs may be activated after synchronization of the received buffered PDCP PDUs is complete.

In particular embodiments, the received QoS flow to DRB mapping comprises a subset of DRBs in use at the network node or at the source network node.

According to some embodiments, a network node is capable of performing handover of a wireless device. The network node comprises processing circuitry operable to: receive a handover request from a source network node; receive, from the source network node, a QoS flow to DRB mapping that was used by the source network node prior to the handover; receive buffered PDCP PDUs from the source network node; transmit the received PDCP PDUs using the received QoS flow to DRB mapping; obtain an indication that handover is complete; determine a new QoS flow to DRB mapping; and activate the new QoS flow to DRB mapping for transmission of PDCP PDUs.

In particular embodiments, the processing circuitry is operable to receive the QoS flow to DRB mapping from the source network node by receiving handover signaling on an Xn interface or by receiving handover signaling via a core network element on an S1 or NG interface.

In particular embodiments, the processing circuitry is further operable to send the new QoS flow to DRB mapping to the source network node. The processing circuitry may be operable to receive PDCP status reporting from the wireless device. The new QoS flow to DRB mapping for transmission of PDCP PDUs may be activated after synchronization of the received buffered PDCP PDUs is complete.

In particular embodiments, the received QoS flow to DRB mapping comprises a subset of DRBs in use at the network node or at the source network node.

According to some embodiments, a network node is capable of performing handover of a wireless device. The network node comprises a receiving module, a transmitting module, and a determining module. The receiving module is operable to: receive a handover request from a source network node; receive, from the source network node, a QoS flow to DRB mapping that was used by the source network node prior to the handover; and receive buffered PDCP PDUs from the source network node. The transmitting module is operable to transmit the received PDCP PDUs using the received QoS flow to DRB mapping. The receiving module is further operable to obtain an indication that handover is complete. The determining module is operable to determine a new QoS flow to DRB mapping, and activate the new QoS flow to DRB mapping for transmission of PDCP PDUs.

Also disclosed is a computer program product. The computer program product comprises instructions stored on non-transient computer-readable media which, when executed by a processor, perform the steps of: receiving a handover request from a source network node; receiving, from the source network node, a quality of service (QoS) flow to data radio bearer (DRB) mapping that was used by the source network node prior to the handover; receiving buffered Packet Data Convergence Protocol (PDCP) protocol data units (PDUs) from the source network node; transmitting the received PDCP PDUs using the received QoS flow to DRB mapping; obtaining an indication that handover is complete; determining a new QoS flow to DRB mapping; and activating the new QoS flow to DRB mapping for transmission of PDCP PDUs.

Certain embodiments of the present disclosure may provide one or more technical advantages. Particular embodiments ensure, at least for periods following the handover procedure, that the flows handed over from source node will be treated with the same QoS in the target node as in the source node. Particular embodiments overcome the problem of packets forwarded by the source node that have already been numbered at PDCP level by the source. Without particular embodiments, such packets may be erroneously interpreted by the target node because the target may consider the source PDCP numbering as one that applies to its own numbering process.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Figure 1:
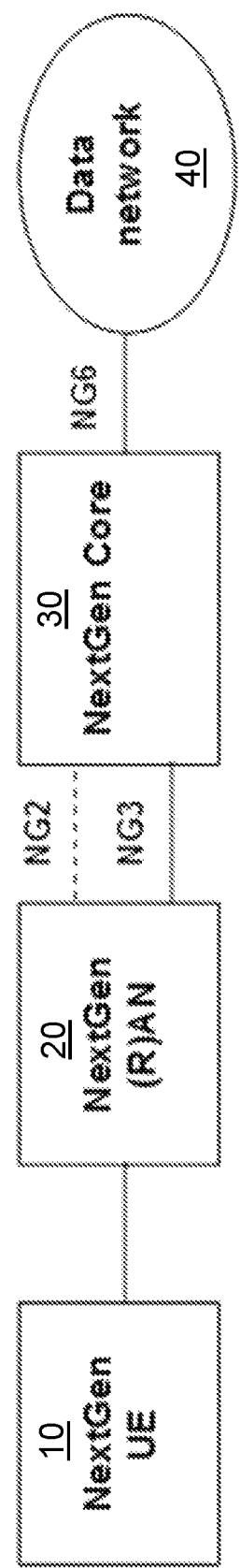
FIG. 1 is a block diagram illustrating a high level architecture of a next generation network.
Figure 2:
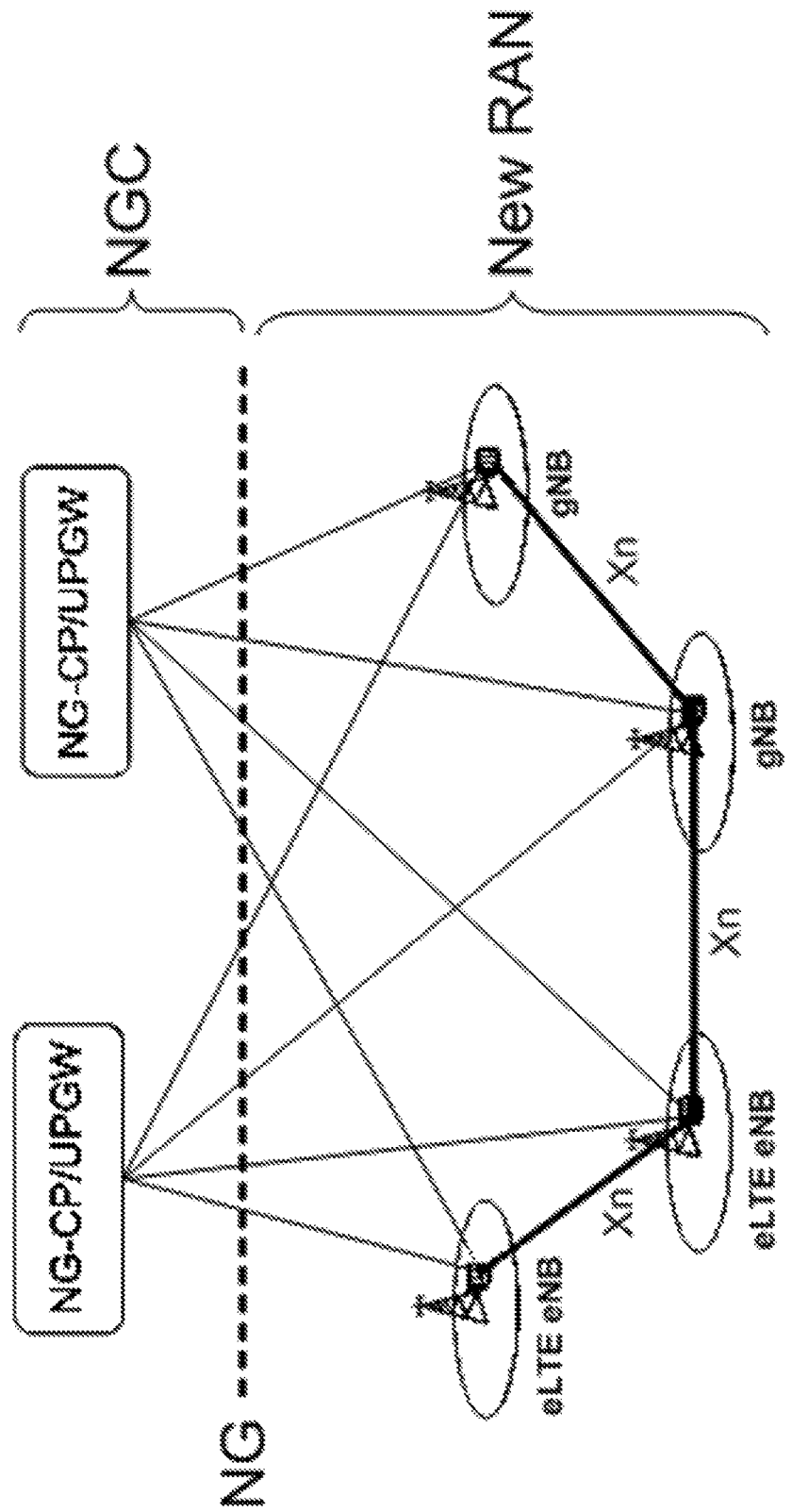
FIG. 2 is a block diagram illustrating the new RAN architecture from 3GPP TR 38.801 V1.0.0.
Figure 3:
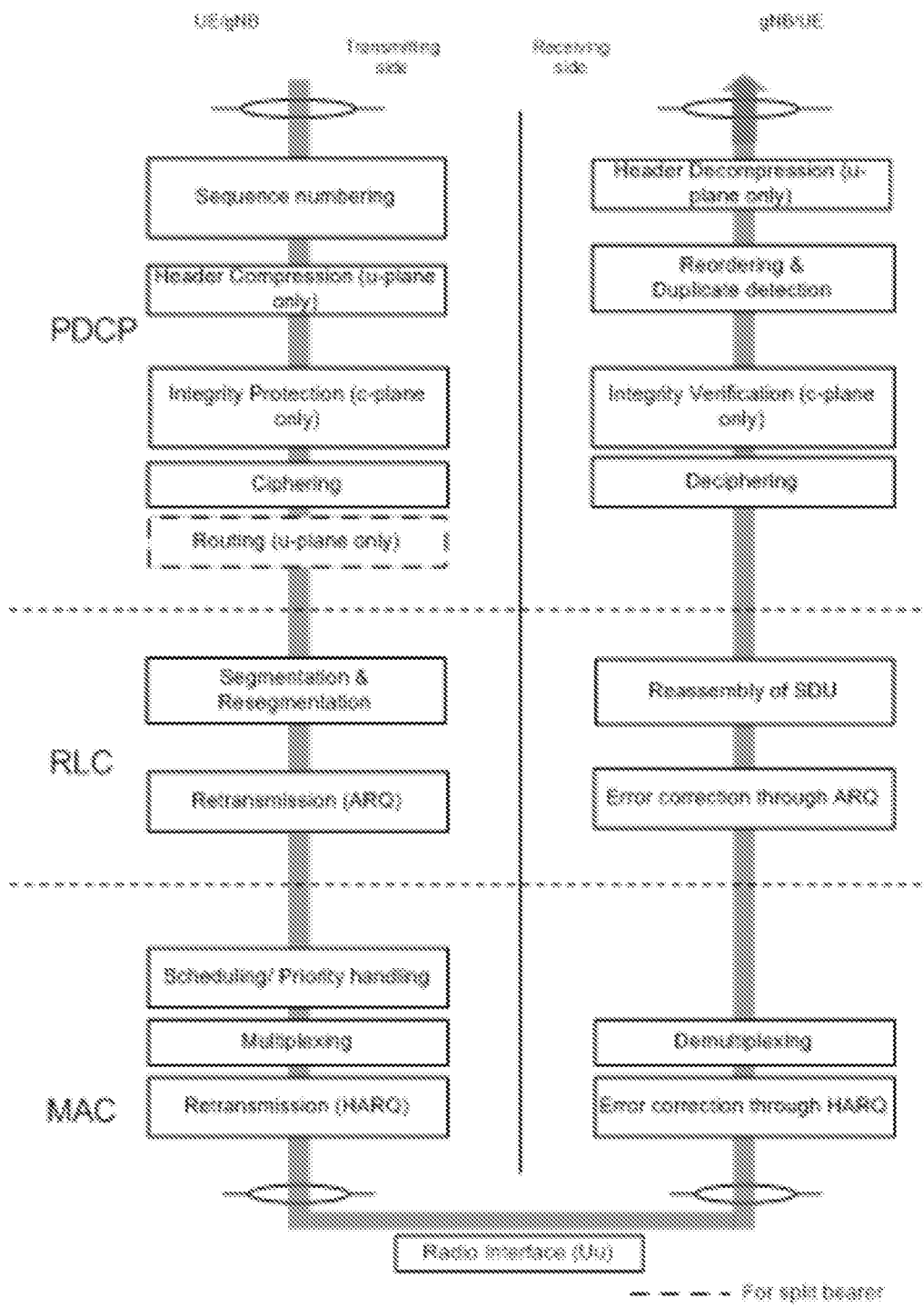
FIG. 3 is a block diagram illustrating the new RAN protocol architecture.
Figure 4:
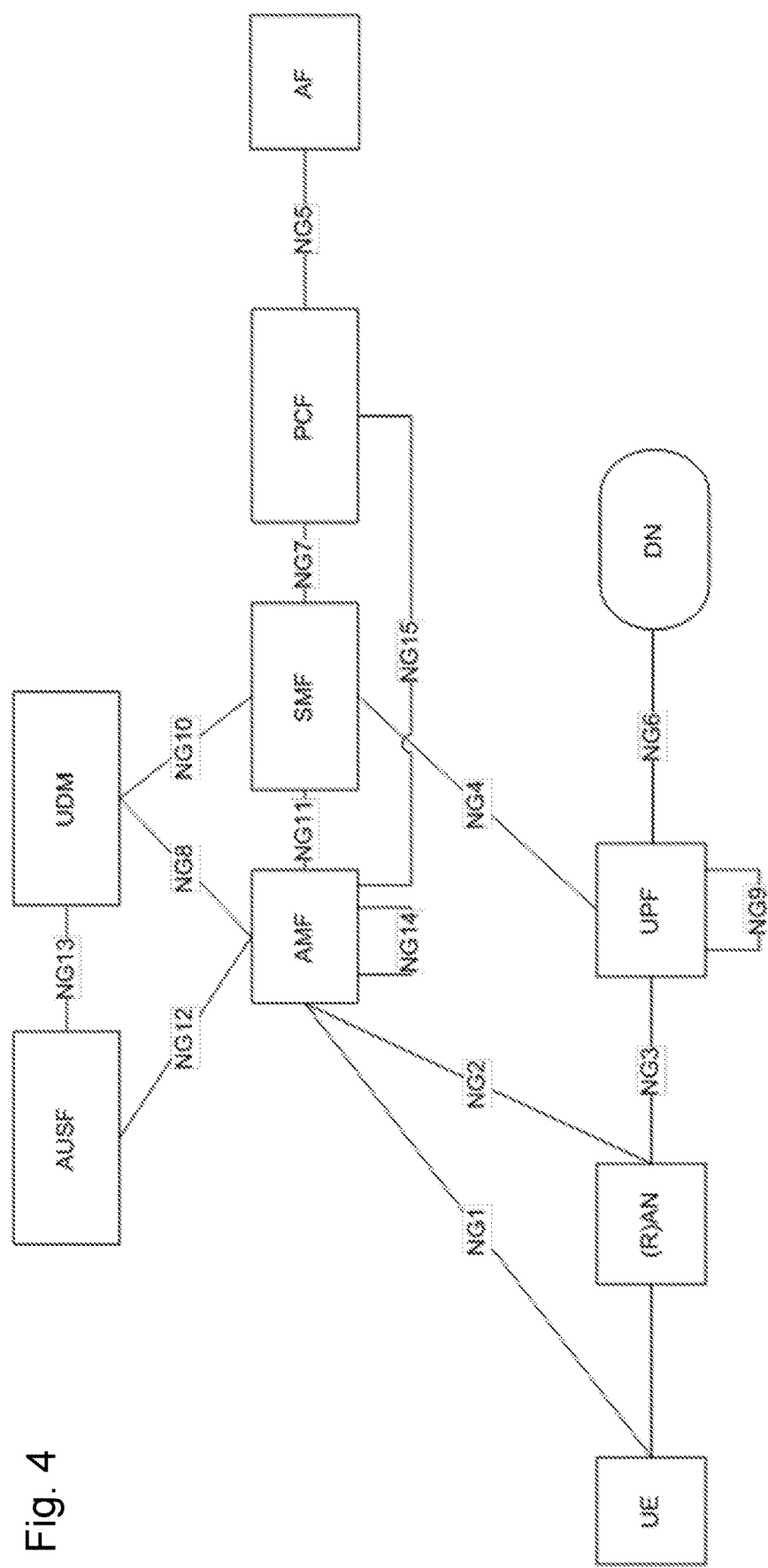
FIG. 4 is a block diagram illustrating the 5G overall system architecture.
Figure 5:
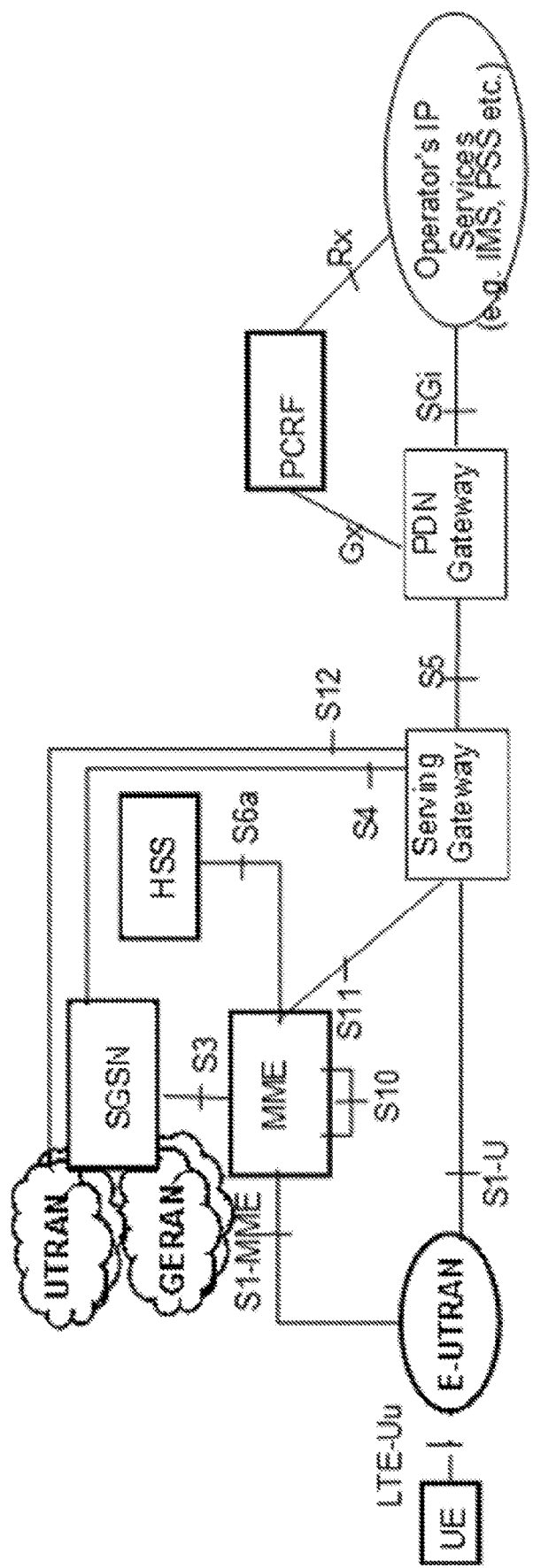
FIG. 5 is a block diagram illustrating an overview of an evolved packet core (EPC) architecture.
Figure 6:
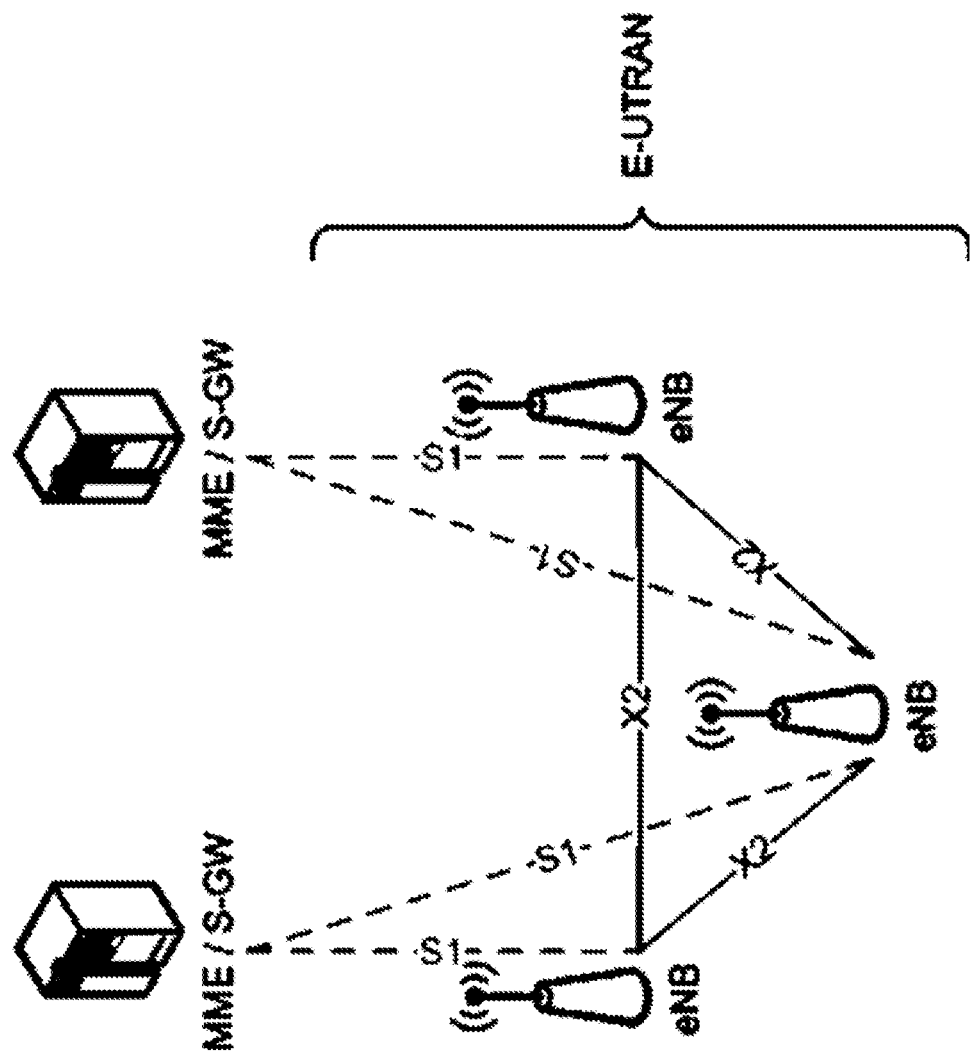
FIG. 6 is a block diagram illustrating an example E-UTRAN architecture.
Figure 7:
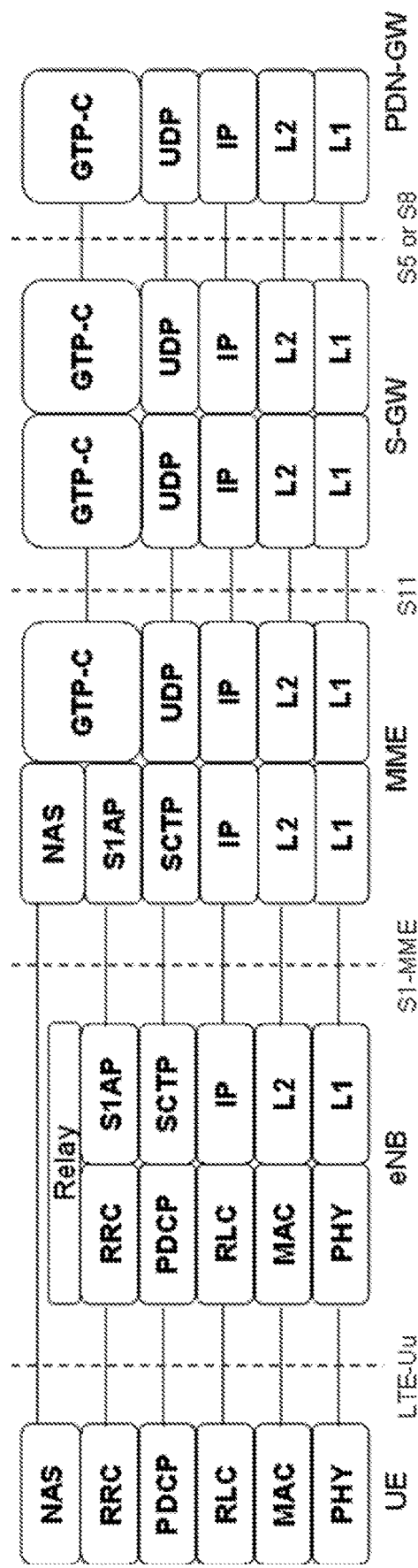
FIG. 7 is a block diagram illustrating the EPC control plane protocol architecture.
Figure 8:
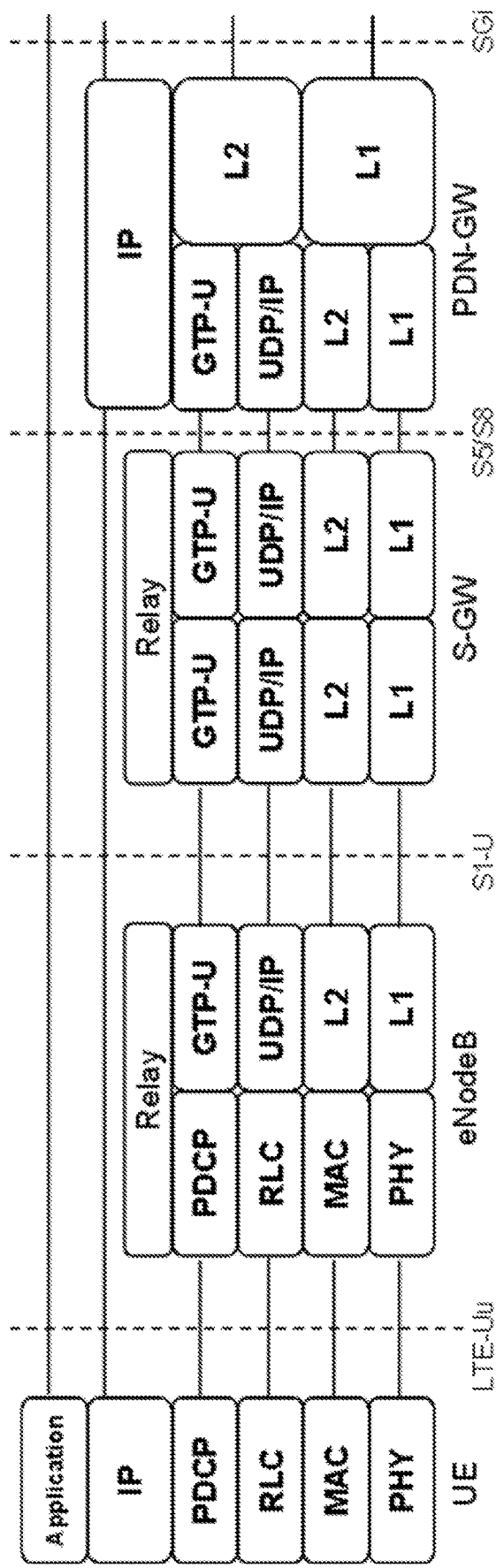
FIG. 8 is a block diagram illustrating the EPC user plane protocol architecture.
Figure 9:
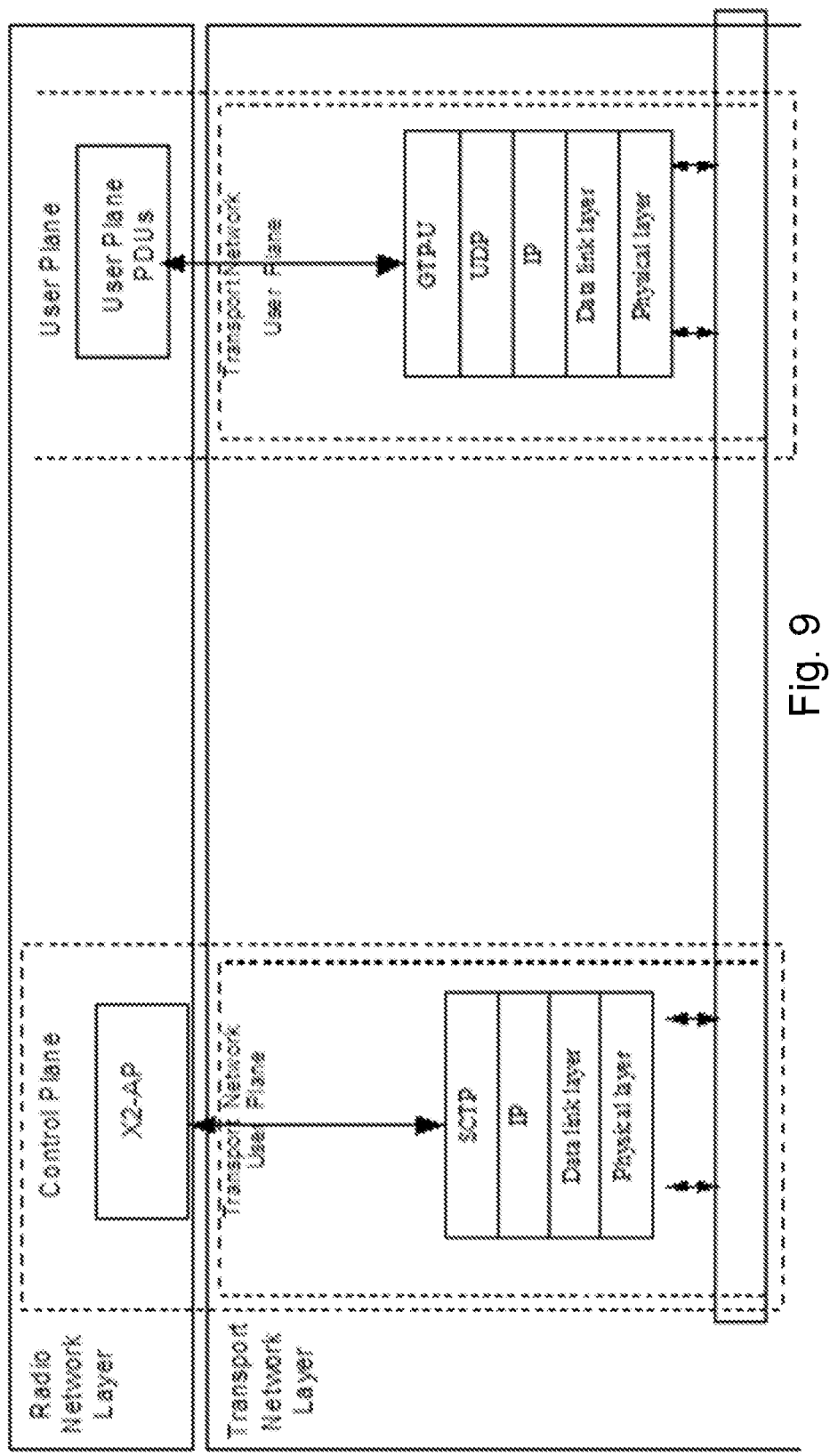
FIG. 9 is a block diagram illustrating the X2 interface protocol structure.
Figure 10A:
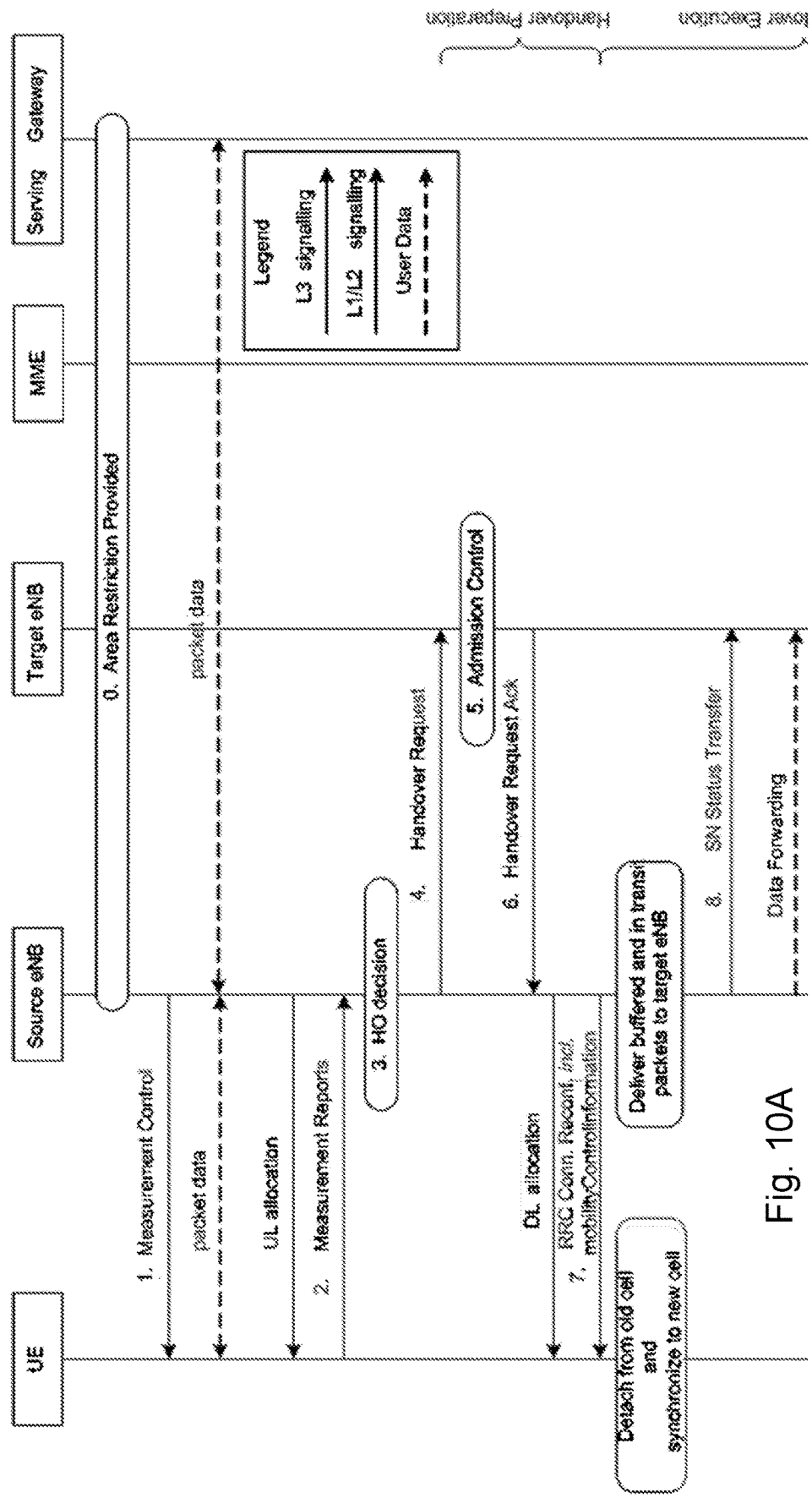
FIGS. 10A and 10B are a flow diagram illustrating the signaling flow for inter-eNB handover.
Figure 10B:
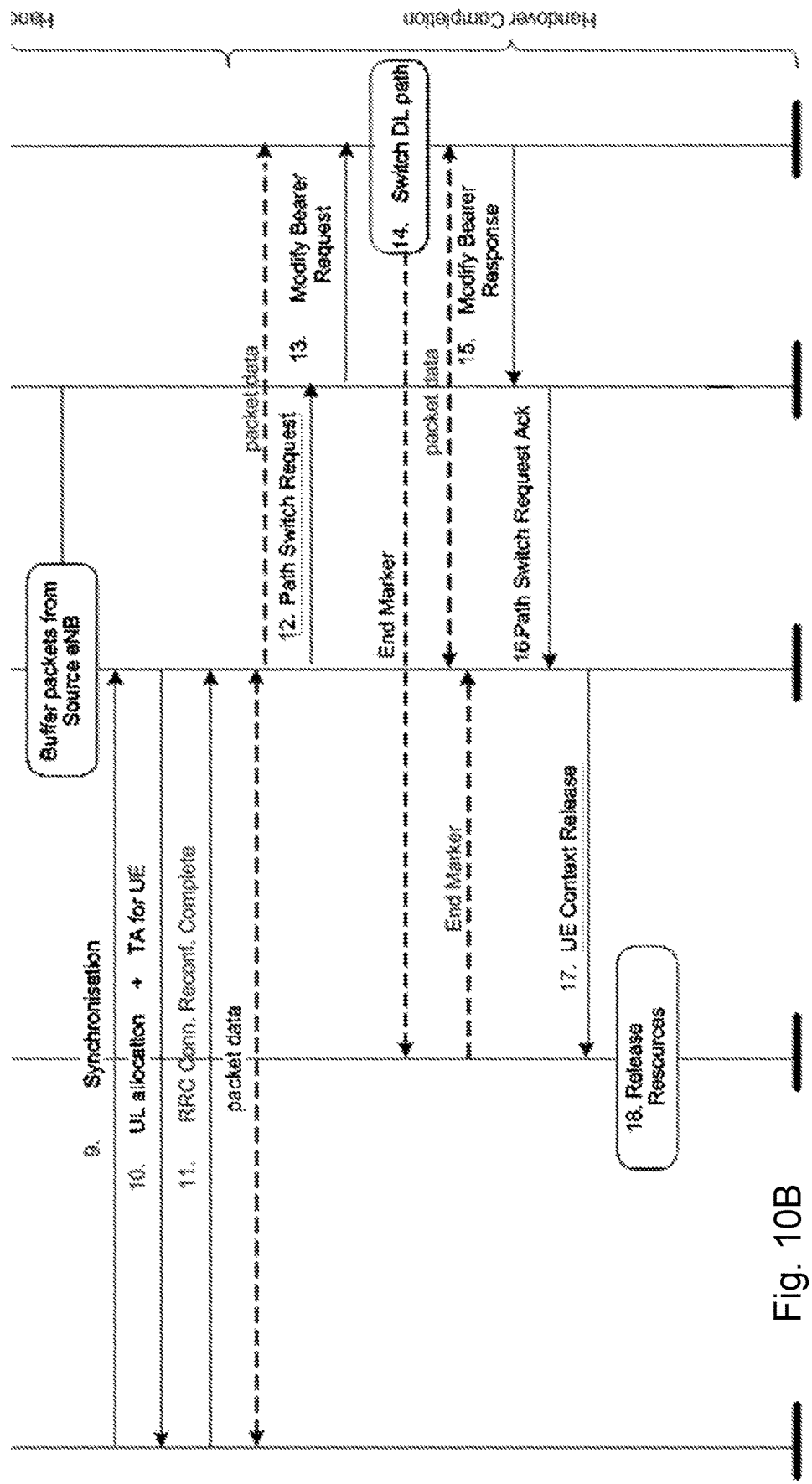
Figure 11:
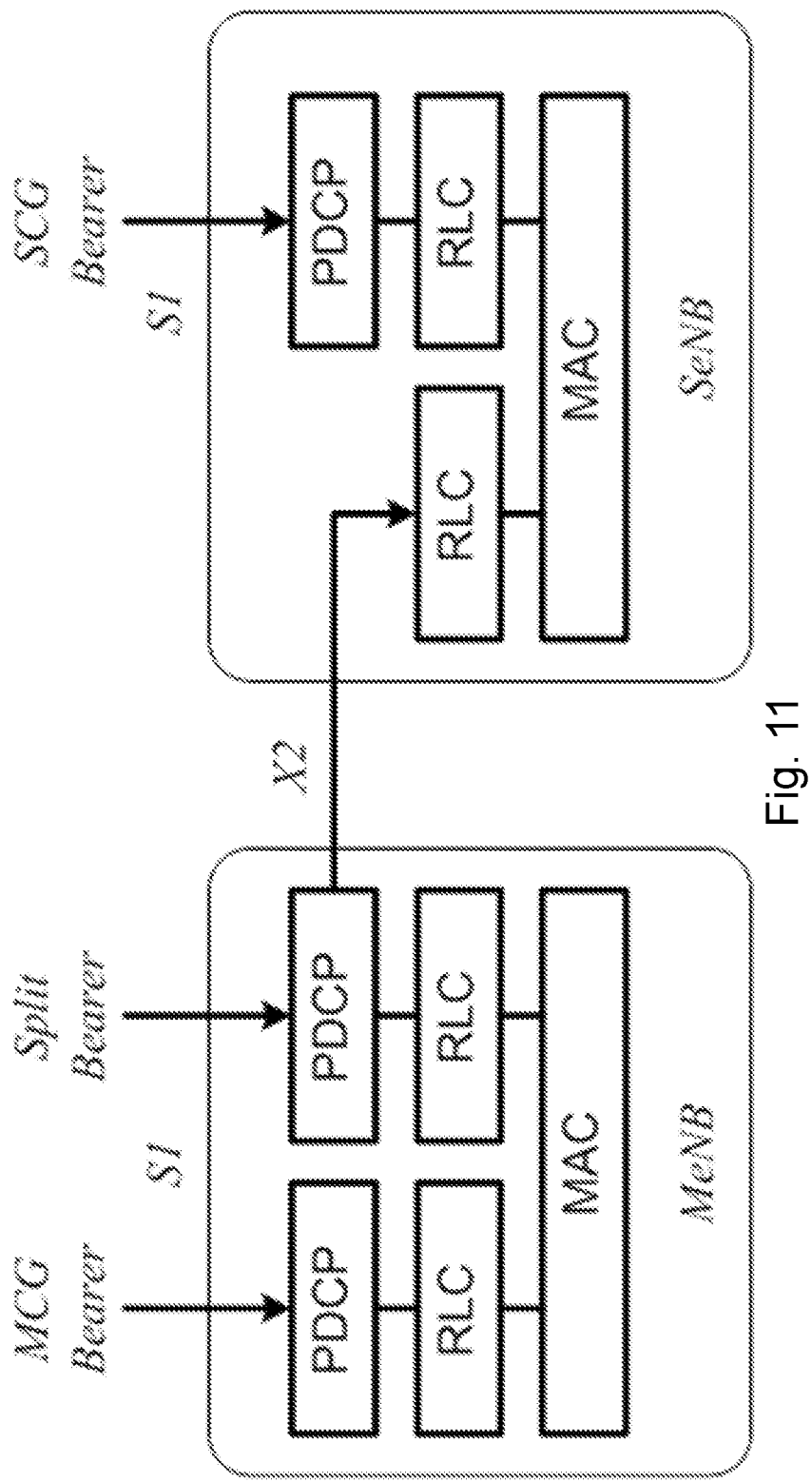
FIG. 11 illustrates a radio protocol architecture for dual connectivity (DC)
Figure 12:
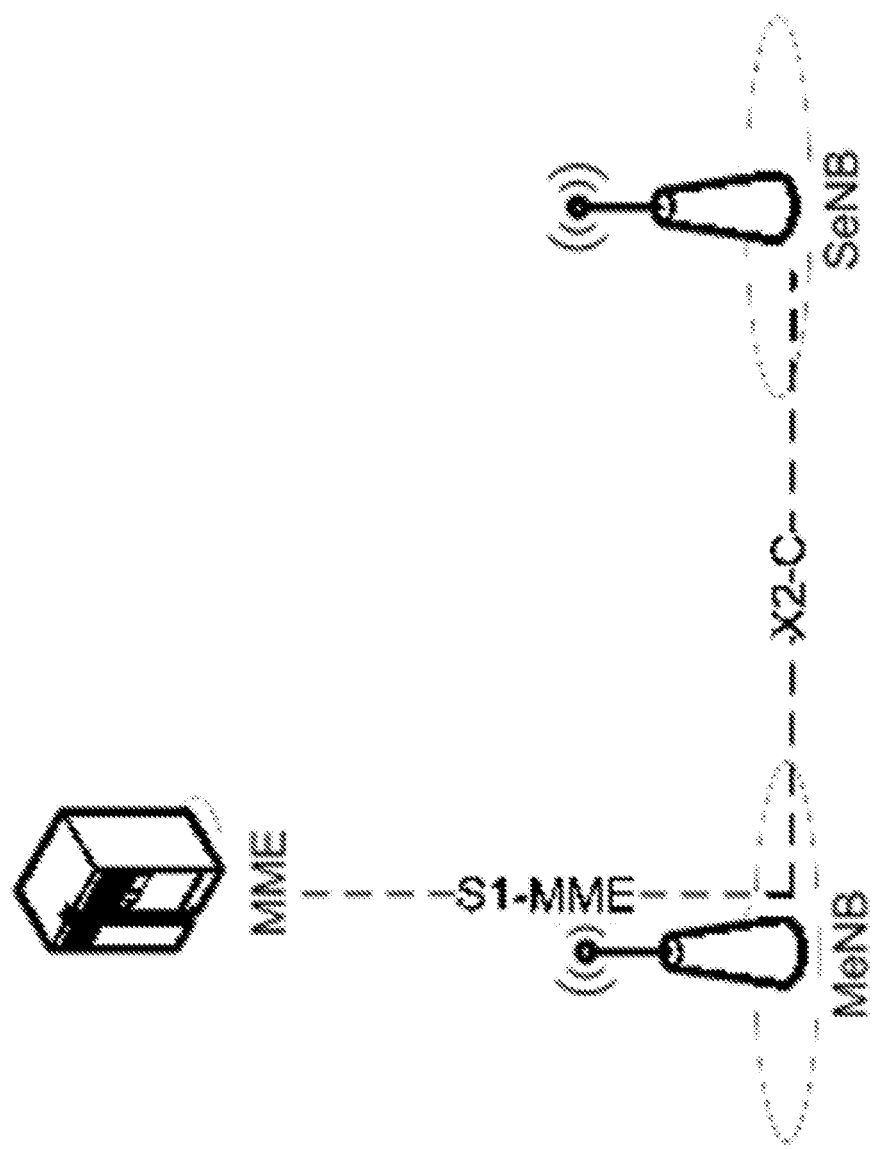
FIG. 12 illustrates control plane connectivity of eNBs involved in DC for a particular UE.
Figure 13:
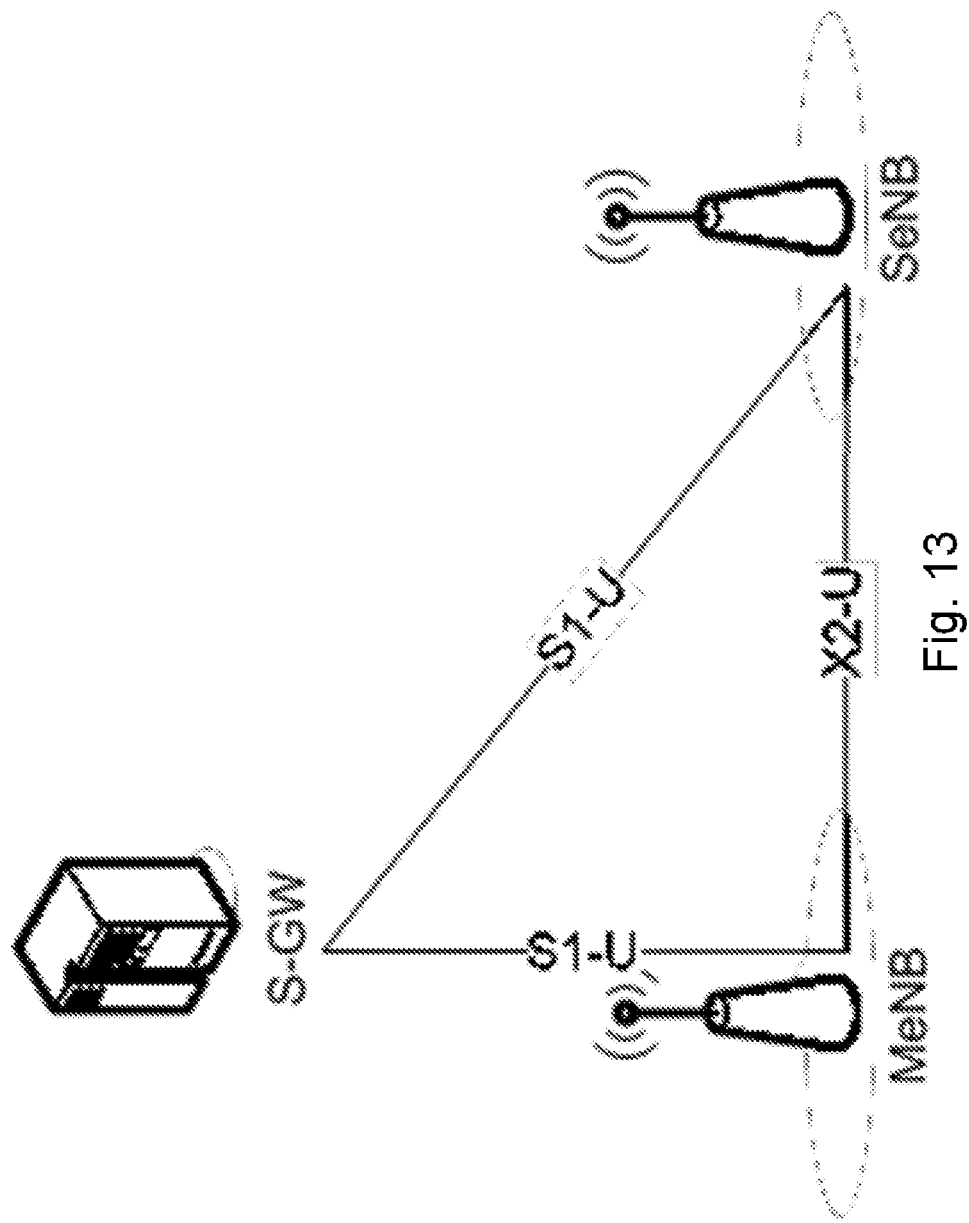
FIG. 13 illustrates user plane connectivity options of eNBs involved in DC for a particular UE.
Figure 14:
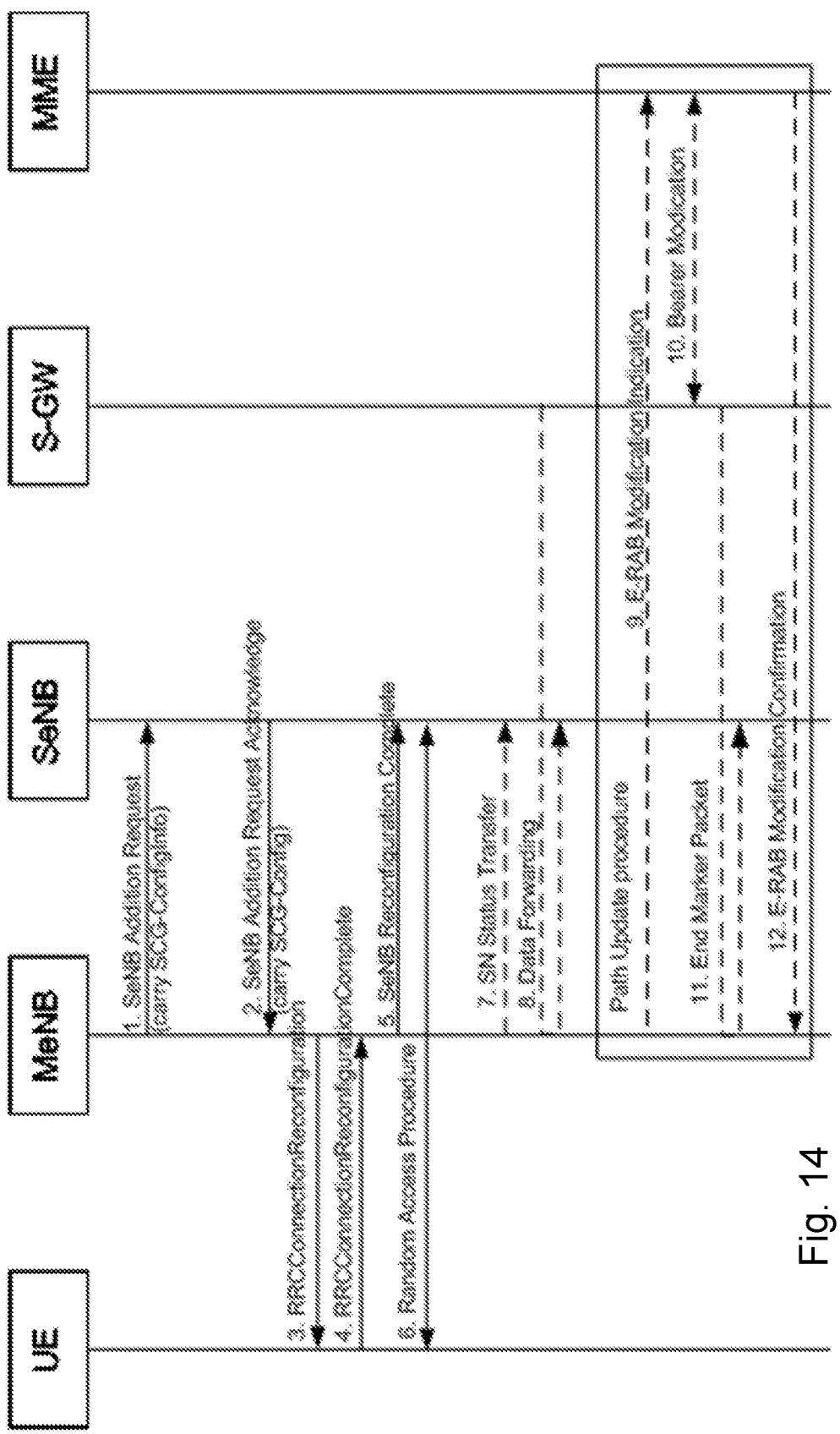
FIG. 14 is a flow diagram illustrating the SeNB Addition procedure.

As described in the Introduction, Third Generation Partnership Project (3GPP) specifies fifth generation (5G) wireless network standardization that includes quality of service (QoS) flow to data radio bearer (DRB) mapping. The new 5G QoS model is based on radio access network (RAN) logic to map 5G QoS Flows to DRBs. The RAN logic may be referred to as a 5G-QoS-flow-to-DRB mapping configuration. A Packet Data Convergence Protocol (PDCP) entity exists for each DRB that performs the 5G-QoS-flow-to-DRB mapping. In addition, the PDCP layer performs sequence numbering (in addition to other functionality) for in-sequence delivery and duplication avoidance in relation to handover between gNBs or eNBs (connected to 5G core network (CN) or next generation CN (NG CN), or when dual connectivity (DC) is activated (or deactivated).

The embodiments and examples below are described in relation to handover between gNBs, but also apply to handover between eNBs connected to NG CN, and when dual connectivity is activated (or deactivated) when the new 5G QoS model is used.

A particular problem with handover is related to a possibility of changing the 5G-QoS-flow-to-DRB mapping configuration when a UE is handed over from a source gNB to a target gNB. The change of 5G-QoS-flow-to-DRB mapping configuration may be needed because using the same 5G-QoS-flow-to-DRB mapping configuration may not always be feasible or possible in both source and target gNBs.

For example, a UE may initially have three 5G QoS flows {flow1, flow2, flow3} mapped to two DRBs {DRB1, DRB2} in the source gNB based on the 5G-QoS-flow-to-DRB mapping configuration in the source gNB (s-gNB). The UE may have the following mapping configuration: flow1 mapped to DRB1; and flow2 & flow3 mapped to DRB2. The target gNB (t-gNB) may have the following 5G-QoS-Flow-to-DRB mapping configuration: flow1 & flow 2 mapped to DRB1; and flow 3 mapped to DRB2.

In the example, flow2 would need to be moved from DRB2 in s-gNB to DRB1 in t-gNB when the UE is handed over from the s-gNB to the t-gNB. Remapping Flow 2 to a DRB supporting a different set of flows in the target node may result in a number of problems. One problem is that packets that have already received a sequence number in the source node will not necessarily be in sequence with other packets in the target node DRB.

Particular embodiments obviate the problems described above. Particular embodiments include a mechanism for 5G-QoS-flow-to-DRB remapping in relation to, for example, handover between gNBs. The embodiments described herein facilitate a target RAN node in a mobility procedure to receive user data from a source RAN node and to deliver such data in a way that lost packets can be recovered. The embodiments also facilitate the target node reusing the same configuration that the source node used for mapping data flows to DRBs. Particular embodiments ensure, at least for periods following the handover procedure, that the flows handed over from source node will be treated with the same QoS in the target node as in the source node. Particular embodiments overcome the problem of packets forwarded by the source node that have already been numbered at PDCP level by the source. Without particular embodiments, such packets may be erroneously interpreted by the target node because the target may consider the source PDCP numbering as one that applies to its own numbering process.

Features of any of the embodiments disclosed herein may be applied to any other embodiment, wherever appropriate. Likewise, any advantage of any of the embodiments may apply to the other embodiments, and vice versa. Other objectives, features and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

In some embodiments a non-limiting term "UE" is used. The UE herein can be any type of wireless device capable of communicating with network node or another UE over radio signals. The UE may also be radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc. The UE may also be referred to as a wireless device.

In some embodiments, generic terminology "network node" is used. It can be any kind of network node which may comprise of a radio network node such as base station, radio base station, base transceiver station, base station controller, network controller, evolved Node B (eNB), Node B, gNB, Multi-cell/multicast Coordination Entity (MCE), relay node, access point, radio access point, Remote Radio Unit (RRU) Remote Radio Head (RRH), a core network node (e.g., MME, SON node, a coordinating node, positioning node (e.g. SMLC, E-SMLC, etc.), MDT node, etc.), or even an external node (e.g., 3rd party node, a node external to the current network), etc.

Particular embodiments are described with reference to FIGS. 15-21B of the drawings, like numerals being used for like and corresponding parts of the various drawings. LTE and NR are used throughout this disclosure as an example cellular system, but the ideas presented herein may apply to other wireless communication systems as well.

Figure 15:
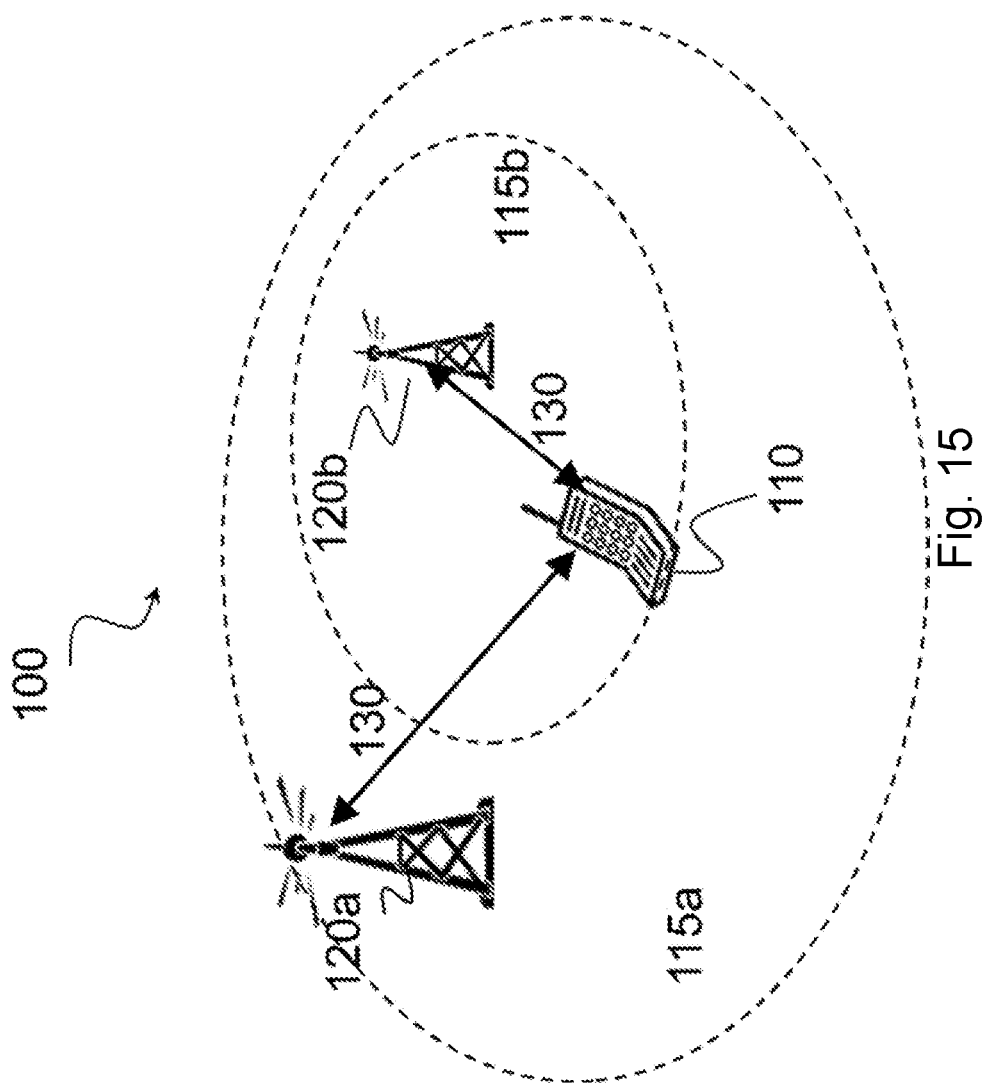
FIG. 15 illustrates an example wireless network, according to a particular embodiment.

FIG. 15 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations, eNodeBs, gNBs, etc.). Network node 120 serves coverage area 115 (also referred to as cell 115).

In general, wireless devices 110 that are within coverage of radio network node 120 (e.g., within cell 115 served by network node 120) communicate with radio network node 120 by transmitting and receiving wireless signals 130. For example, wireless devices 110 and network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Wireless signals 130 may include both downlink transmissions (from radio network node 120 to wireless devices 110) and uplink transmissions (from wireless devices 110 to radio network node 120).

Wireless signals 130 may include data encapsulated in one or more protocols. For example, wireless signals 130 may include data encapsulated using PDCP 135. Each radio network element (e.g., wireless device 110, network node 120, etc.) may include a PDCP transmitter and a PDCP receiver. When network node 120a hands off wireless device 110 to network node 120b, particular PDCP parameters, such as the PDCP SN, may change.

Wireless signals 130 may include one or more data radio bearers (DRBs), as described in the Introduction. Data may be transmitted according to one or more QoS flows. A QoS flow may be mapped to one of the one or more DRBs. When network node 120a hands off wireless device 110 to network node 120b, the QoS flow to DRB mapping may change.

For example, network node 120b may receive a handover request from network node 120a for wireless device 110. Network node 120b may receive, from network node 120a, a QoS flow to DRB mapping that was used by network node 120a prior to the handover. In particular embodiments, the QoS flow to DRB mapping may comprise part of the handover signaling. Network node 120b may receive buffered PDCP protocol data units (PDUs) from network node 120a. Network node 120b may transmit the received PDCP PDUs using the received QoS flow to DRB mapping. In particular embodiments, after obtaining an indication that handover is complete, network node 120b determines a new QoS flow to DRB mapping. Network node 120b activates the new QoS flow to DRB mapping for transmission of new PDCP PDUs.

In particular embodiments, network node 120b may determine the new QoS flow to DRB mapping before the handover is complete. Network node 120b may send the new QoS flow to DRB mapping to network node 120a. Network node 120a may send the new QoS flow to DRB mapping to wireless device 110. Wireless device 110 may determine whether to use the old, new, or a combination of both QoS flow to DRB mappings when sending PDCP PDUs and/or PDCP status reports to network node 120b. More detailed examples are described with respect to FIGS. 16-19.

In some embodiments, wireless device 110 may be referred to by the non-limiting term "UE." A UE may include any type of wireless device capable of communicating with a network node or another UE over radio signals. The UE may comprise radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc.

In some embodiments, network node 120 may include any type of network node such as a base station, radio base station, base transceiver station, base station controller, network controller, evolved Node B (eNB), Node B, gNB, multi-RAT base station, Multi-cell/multicast Coordination Entity (MCE), relay node, access point, radio access point, Remote Radio Unit (RRU) Remote Radio Head (RRH), a core network node (e.g., MME, SON node, a coordinating node, etc.), or even an external node (e.g., 3rd party node, a node external to the current network), etc.

Each network node 120 may have a single transmitter or multiple transmitters for transmitting wireless signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120.

In wireless network 100, each network node 120 may use any suitable radio access technology, such as long term evolution (LTE), LTE-Advanced, NR, UMTS, HSPA, GSM, cdma2000, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described below with respect to FIG. 20. Similarly, a network node may include any suitable combination of hardware and/or software. For example, in particular embodiments, a network node, such as network node 120, may include the components described below with respect to FIG. 21A.

Figure 16:
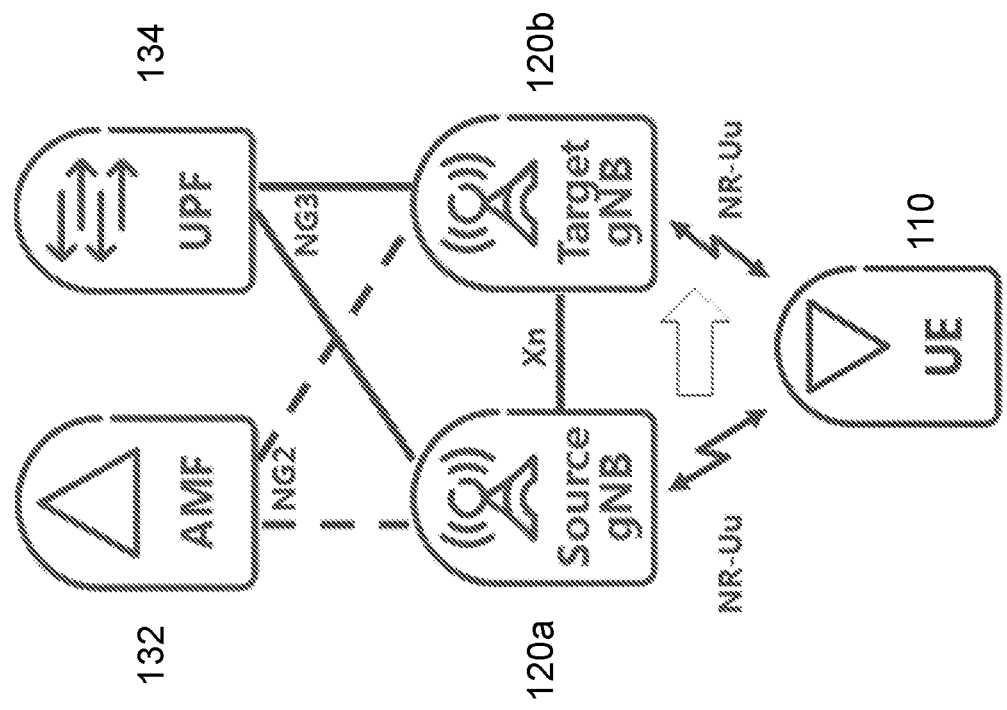
FIG. 16 is a block diagram illustrating a particular network architecture, according to some embodiments.

FIG. 16 is a block diagram illustrating a particular network architecture, according to some embodiments. Authentication and Management Function (AMF) 132 is illustrated as the control plane CN function visible to RAN and connected to RAN via the NG2 interface (also referred to as the NG-C interface). User plane function (UPF) 134 is illustrated as the user plane CN function visible to RAN and connected to RAN via the NG3 interface (also referred to as the NG-U interface). Two gNBs 120 are shown as source gNB 120a and target gNB 120b indicating that UE 110 is about to perform handover from source gNB 120a to target gNB 120b. In addition, source and target gNBs 120 are connected via the Xn interface. Only CN nodes directly connected to RAN are illustrated in FIG. 16.

In a first group of embodiments, the t-gNB receives from the s-gNB the QoS flow to DRB mapping (i.e., 5G-QoS-Flow-to-DRB mapping) that was applied by the s-gNB. The t-gNB uses the received QoS flow to DRB mapping and may update the configuration after the handover has completed. In particular embodiments, for as long as the handover procedure lasts, the t-gNB applies the QoS flow to DRB mapping used previously by the s-gNB. When the handover procedure is complete, the t-gNB is free to map flows to DRBs as it is best for such node. An example is illustrated in FIG. 17.

Figure 17:
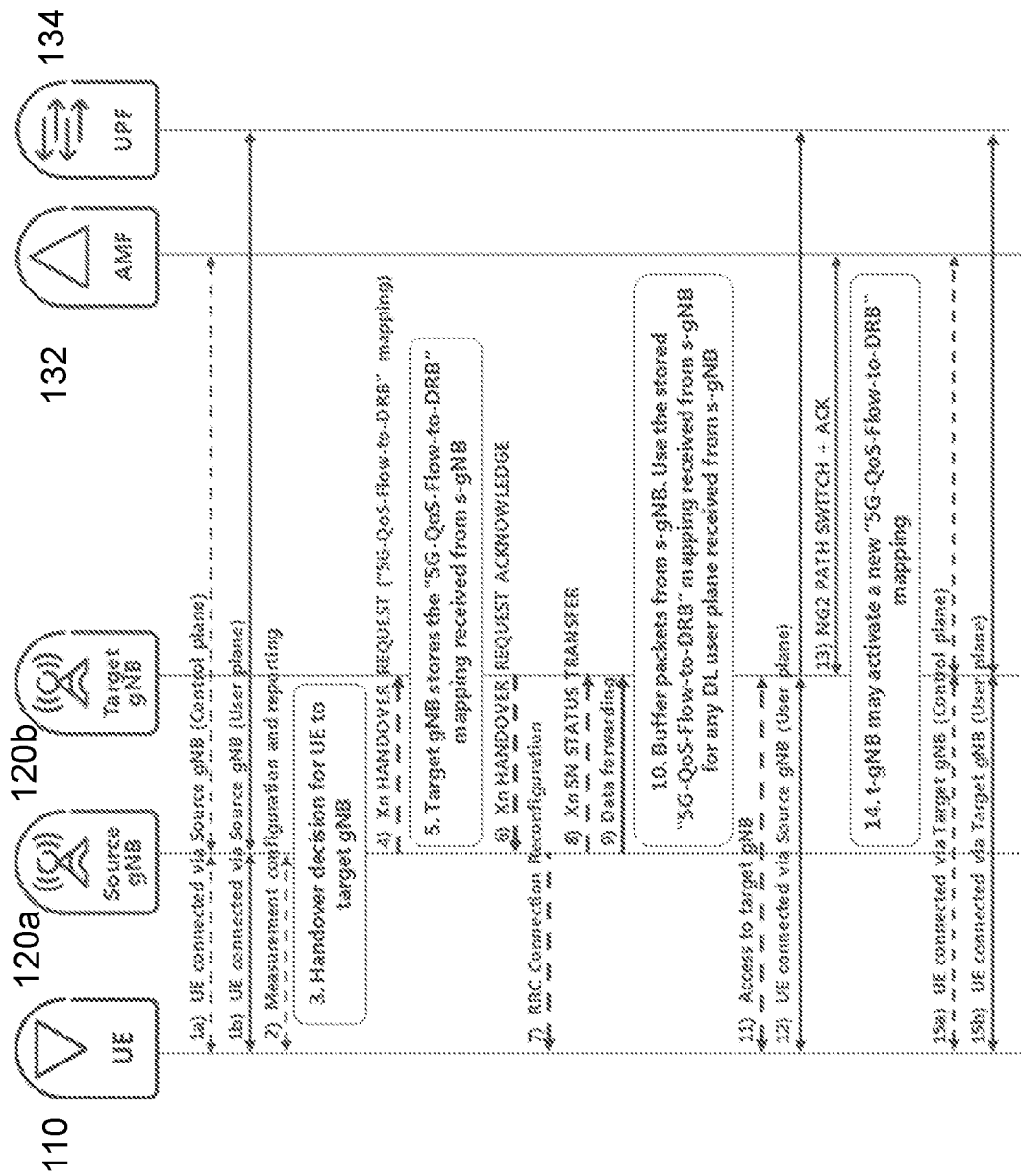
FIG. 17 is a flow diagram illustrating example handover signalling, according to some embodiments.

FIG. 17 is a flow diagram illustrating example handover signalling, according to some embodiments. UE 110 is has a control plane connection to AMF 132 and a user plane connection to UPF 134 via source gNB 120a (steps 1a and 1b). UE 110 performs measurements and reports the measurements to source gNB 120a at step 2. Based on the measurements, a handover decision to target gNB 120b is made at step 3. Handover is initiated at step 4. At step 5, target gNB 120b receives and stores the QoS flow to DRB mapping used previously by source gNB 120a. The handover continues and buffered PDCP PDUs, PDCP SN, and other status are exchanged in steps 6-9.

At step 10, any downlink PDCP PDUs received from source gNB 120a are stored using the received QoS flow to DRB mapping. If the PDCP PDUs are transmitted, they are transmitted using the received QoS flow to DRB mapping. The handover is completed at steps 11-13. At step 14, target gNB 120b activates a new QoS flow to DRB mapping. The new mapping will be used for any new packets received from higher or lower layers.

Mechanisms to send the QoS flow to DRB mapping used in the s-gNB from the s-gNB to the t-gNB could be via the handover signalling. For handovers based on a gNB to gNB interface, e.g. the Xn interface in 5G, the information can be sent directly from s-gNB to t-gNB, while for handovers that involve the CN the information may be sent via the RAN-CN interface, for example within transparent containers. In 5G such RAN-CN interface could be the S1 interface or the NG interface, as it is currently named in 3GPP RAN3.

Events that can trigger the t-gNB to freely use any QoS flow to DRB mapping configuration (i.e., not to follow the s-gNB QoS flow to DRB mapping) may consist of termination of reception of forwarded data or termination of reception of PDCP numbered packets or configured timers starting at any set point of the handover procedure (e.g., starting at the time when the t-gNB sends the Relocation Request Acknowledge message).

In a second group of embodiments, both the old s-gNB mapping and the new t-gNB mapping are used simultaneously until data forwarding is completed. In particular embodiments, the t-gNB activates a new QoS flow to DRB mapping as part of the handover preparation. Both the old QoS flow to DRB mapping (controlled by s-gNB) and the new QoS flow to DRB mapping are used in parallel both by the UE and the t-gNB (or optionally only by one of these entities). The old QoS flow to DRB mapping is used for PDCP PDUs handled by the PDCP layer (handled meaning for example that a PDCP SN was allocated) either in the s-gNB or in the UE in relation to the connection to the s-gNB. An example is illustrated in FIG. 18.

Figure 18:
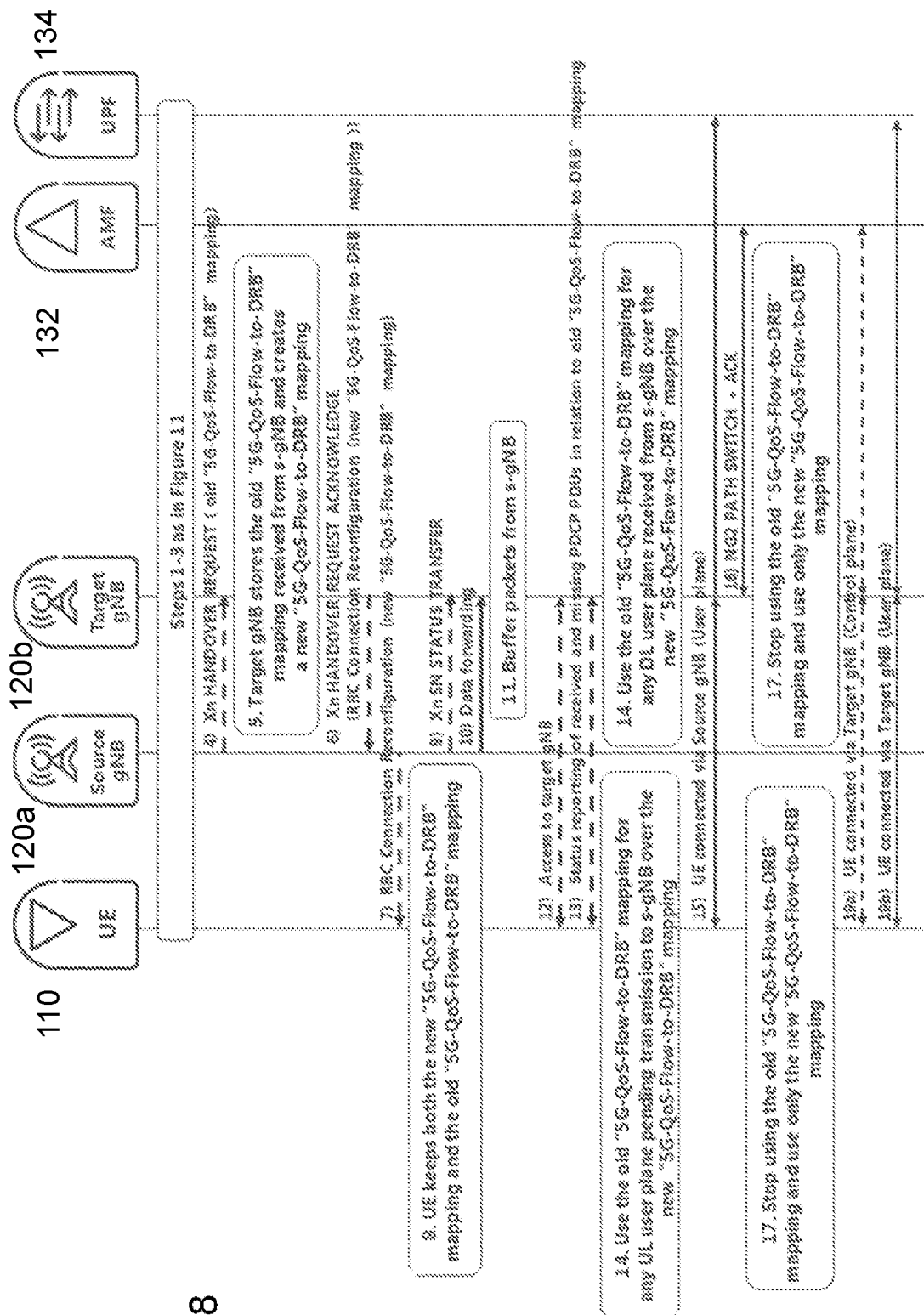
FIG. 18 is a flow diagram illustrating another example of handover signalling, according to some embodiments.

FIG. 18 is a flow diagram illustrating another example of handover signalling, according to some embodiments. In general, the activation of the new QoS flow to DRB mapping at t-gNB can be, for example, based on any combination of the old QoS flow to DRB mapping received from the s-gNB, detected 5G QoS flows reported by the s-gNB, and local configuration in the t-gNB.

The t-gNB receives, from the s-gNB, the old QoS flow to DRB mapping that was applied by the s-gNB (step 4 of FIG. 18). The t-gNB stores the old QoS flow to DRB mapping received from the s-gNB and creates a new QoS flow to DRB mapping (step 5). The new QoS flow to DRB mapping is returned to the s-gNB for further transmission to the UE (steps 6 and 7). The UE keeps both the new "QoS flow to DRB mapping and the old QoS flow to DRB mapping (step 8). To ensure loss-less handover, the target node and the UE exchange information (i.e., status reporting) about which PDCP PDUs have been successfully received by the UE and which are missing (step 13). The exchange of the information is based on the QoS flow to DRB mapping on the s-gNB side. Respective PDCP sequence numbers cannot be mapped to the new-target-side configuration (i.e., to the new QoS flow to DRB mapping).

In addition to the PDCP sequence number, 5G may include a QoS flow identification indicated in the PDCP header. Therefore, it is possible to distinguish QoS flows via the QoS flow identifier, even if they are mapped to DRBs differently on the source and target gNBs.

The following are two examples of how to perform (re)transmission of PDCP PDUs for which SNs have been allocated at the s-gNB in step 14 and shown both for the UE and the t-gNB. In some embodiments, this step may only be performed by one of the entities, for example, only by the t-gNB.

In one example, PDCP PDUs for which PDCP SNs were allocated at the s-gNB (i.e., based on the old QoS flow to DRB mapping) are sent with the source side SNs via the new DRB configuration. A field in the PDCP header is included to include PDCP SNs for both old and new QoS flow to DRB mappings. Another alternative includes two PDCP headers. For example, the old PDCP header with s-gNB allocated SNs may be nested within a new PDCP header created by the t-gNB, which facilitates the t-gNB applying t-gNB PDCP sequence numbering while synchronization of transmission status may apply the s-gNB sequence numbering and respective (re)transmission of PDUs as long as necessary.

In another example, the UE and the t-gNB apply the old QoS flow to DRB mapping and PDCP sequence numbering until synchronization of transmission status and respective (re)transmission of PDCP PDUs is finalized. After that, the t-gNB configuration applies (i.e., the new QoS flow to DRB mapping is used).

Common to both examples is that data forwarding via the Xn interface and respective SN Status Information (step 9) exchange may be applied as specified for LTE on the X2 interface. A difference is the possibility to use new sequence number ranges.

For the t-gNB to determine whether the special treatment along the possibilities described above has to be applied, the t-gNB receives the old QoS flow to DRB mapping from the s-gNB.

In some embodiments, the above described t-gNB and UE functions are applied only for a subset of DRBs. For example, if the QoS flow to DRB mapping for a subset of the DRBs has not changed, then applying the functionality may not be necessary.

Another example that does not fall into the category of providing loss-less mobility is not synchronize the PDCP reception status, but to only forward plain IP packets as received from the UPF. This might lead to packet loss and/or to packet duplication, but it simplifies the procedures in the RAN.

A QoS flow to DRB mapping configuration may be represented in different ways. In a simple form, the representation indicates the relation between the different 5G QoS flows and DRBs. In addition, the related uplink and downlink PDCP SN, HFN, or any other PDCP entity internal information related to a specific DRB may also be part of the QoS flow to DRB mapping configuration.

While particular embodiments and examples are described with respect to handover between gNBs, particular embodiments also apply to handover between eNBs connected to NG CN, and when dual connectivity is activated (or deactivated) in the cases when the new 5G QoS model is used.

In addition, while particular embodiments and examples are described where the Xn interface is used for the handover between two gNBs, particular embodiments may use an NG/NG2 interface based handover. Also, although particular embodiments use direct data forwarding between gNBs, particular embodiments may use indirect data forwarding between gNBs via the UPF.

Figure 19:
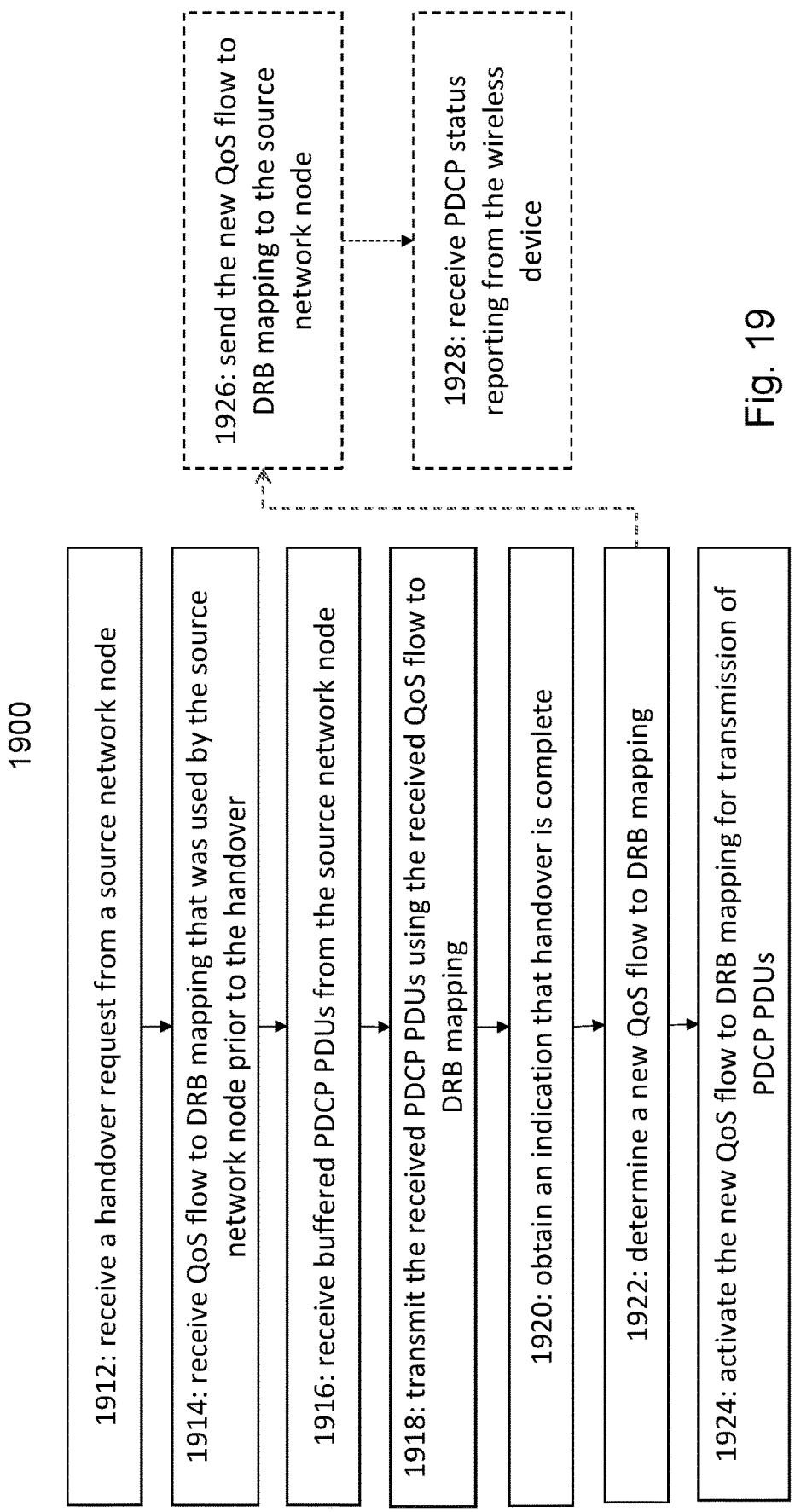
FIG. 19 is a flow diagram of an example method in a network node, according to some embodiments.

While FIGS. 17 and 18 illustrate signaling between multiple network components, FIG. 19 illustrates steps performed by a particular network component, such as a network node.

FIG. 19 is a flow diagram of an example method in a network node, according to some embodiments. In particular embodiments, one or more steps may be performed by network node 120 described with reference to FIG. 15.

The method begins at step 1912, where a network node receives a handover request from a source network node. For example, network node 120b may receive a handover request from network node 120a for wireless device 110 (e.g., step 4 of FIG. 17 or 18)/

At step 1914, the network node receives, from the source network node, a QoS flow to DRB mapping that was used by the source network node prior to the handover. For example, network node 120b may receive the QoS flow to DRB mapping that was used by network node 120a prior to the handover (e.g., step 4 of FIG. 17 or 18).

The prior QoS flow to DRB mapping may include a flow1 mapped to a DRB1 and a flow2 and a flow3 mapped to a DRB2. The QoS flow to DRB mapping may be included in the handover signaling. In particular embodiments, receiving the QoS flow to DRB mapping from the source network node comprises receiving handover signaling on an Xn interface or via a core network element on an S1 or NG interface.

At step 1916, the network node receives buffered PDCP PDUs from the source network node. For example, network node 120a may have buffered PDCP PDUs that have not yet been acknowledged by wireless device 110. Network node 120a may send the buffered PDCP PDUs to network node 120b (e.g., steps 8 and 9 of FIG. 17 or steps 9 and 10 of FIG. 18).

At step 1918, the network node transmits the received PDCP PDUs using the received QoS flow to DRB mapping. For example, network node 120b may transmit any downlink user plane PDCP PDUs to wireless device 110 using the QoS flow to DRB mapping received from network node 120a (e.g., step 10 of FIG. 17 or step 14 of FIG. 18).

At step 1920, the network node obtains an indication that handover is complete. For example, network node 120b may receive a path switch acknowledgement from the core network (e.g., AMF 132). An example is illustrated in step 13 of FIG. 17 or step 16 of FIG. 18.

At step 1922, the network node determines a new QoS flow to DRB mapping. For example, particular requirements and resources of network node 120b may result in network node 120b determining a new QoS flow to DRB mapping than the mapping used by network node 120a (e.g., step 14 of FIG. 17 or step 5 of FIG. 18). The new QoS flow to DRB mapping may include a flow1 and a flow2 mapped to a DRB1 and a flow3 mapped to a DRB2.

At step 1924, the network node activates the new QoS flow to DRB mapping for transmission of PDCP PDUs. For example, network node 120b will use the new QoS flow to DRB mapping for PDCP PDUs received from higher or lower protocol layers.

In some embodiments, particular steps may be performed in a different order than the numerical order described above. For example, in some embodiments the network node may determine the new QoS flow to DRB mapping of step 1922 after or around the same time as step 1914 (e.g., step 5 of FIG. 18).

In some embodiments, the network node may use the new QoS flow to DRB mapping according to steps 1926-1928. At step 1926, the network node sends the new QoS flow to DRB mapping to the source network node. For example, network node 120b may send the new QoS flow to DRB mapping to network node 120a (e.g., step 6 of FIG. 18). Network node 120a may send the new QoS flow to DRB mapping to wireless device 110 (e.g., step 7 of FIG. 18). Wireless device 110 may use a combination of the old and new QoS flow to DRB mapping to send status reports or acknowledgements to network node 120a and/or network node 120b.

At step 1928, the network node receives PDCP status reporting from the wireless device. For example, network node 120b may receive PDCP status reports from wireless device 110 (e.g., step 13 of FIG. 18). The new QoS flow to DRB mapping for transmission of PDCP PDUs may be activated (i.e., step 1924) after synchronization of the received buffered PDCP PDUs is complete.

Modifications, additions, or omissions may be made to the method illustrated in FIG. 19. Additionally, one or more steps in the method may be performed in parallel or in any suitable order.

Figure 20:
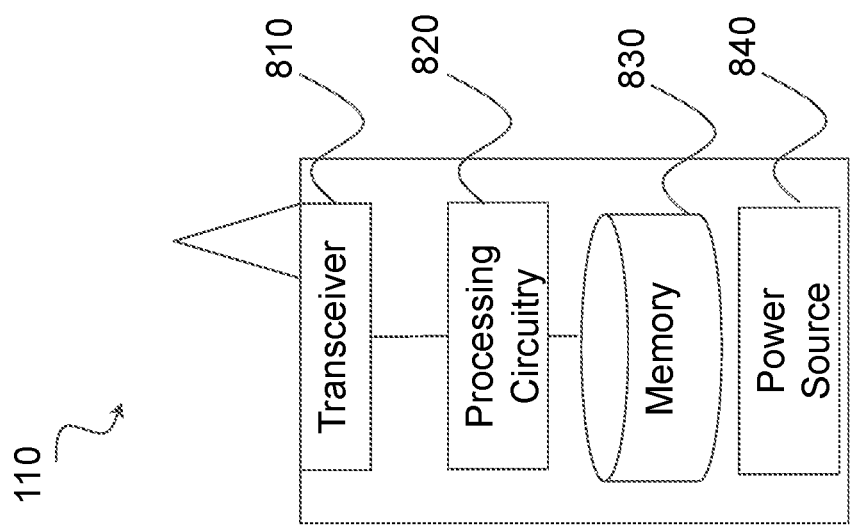
FIG. 20 is a block diagram illustrating an example embodiment of a wireless device.

FIG. 20 is a block diagram illustrating an example embodiment of a wireless device. The wireless device is an example of the wireless devices 110 illustrated in FIG. 15. The wireless device is capable of performing a handover from a first cell to a second cell where a QoS flow to DRB mapping for the second cell may be different than a QoS flow to DRB mapping for the first cell.

Particular examples include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a NB-IoT device, or any other device that can provide wireless communication. The wireless device includes transceiver 810, processing circuitry 820, memory 830, and power source 840. In some embodiments, transceiver 810 facilitates transmitting wireless signals to and receiving wireless signals from wireless network node 120 (e.g., via an antenna), processing circuitry 820 executes instructions to provide some or all of the functionality described herein as provided by the wireless device, and memory 830 stores the instructions executed by processing circuitry 820. Power source 840 supplies electrical power to one or more of the components of wireless device 110, such as transceiver 810, processing circuitry 820, and/or memory 830.

Processing circuitry 820 includes any suitable combination of hardware and software implemented in one or more integrated circuits or modules to execute instructions and manipulate data to perform some or all of the described functions of the wireless device. In some embodiments, processing circuitry 820 may include, for example, one or more computers, one more programmable logic devices, one or more central processing units (CPUs), one or more microprocessors, one or more applications, and/or other logic, and/or any suitable combination of the preceding. Processing circuitry 820 may include analog and/or digital circuitry configured to perform some or all of the described functions of wireless device 110. For example, processing circuitry 820 may include resistors, capacitors, inductors, transistors, diodes, and/or any other suitable circuit components.

Memory 830 is generally operable to store computer executable code and data. Examples of memory 830 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 840 is generally operable to supply electrical power to the components of wireless device 110. Power source 840 may include any suitable type of battery, such as lithium-ion, lithium-air, lithium polymer, nickel cadmium, nickel metal hydride, or any other suitable type of battery for supplying power to a wireless device.

In particular embodiments, processing circuitry 820 in communication with transceiver 810 communicates PDCP encapsulated data with network node 120. Other embodiments of the wireless device may include additional components (beyond those shown in FIG. 20) responsible for providing certain aspects of the wireless device's functionality, including any of the functionality described above and/or any additional functionality (including any functionality necessary to support the solution described above).

Figure 21B:
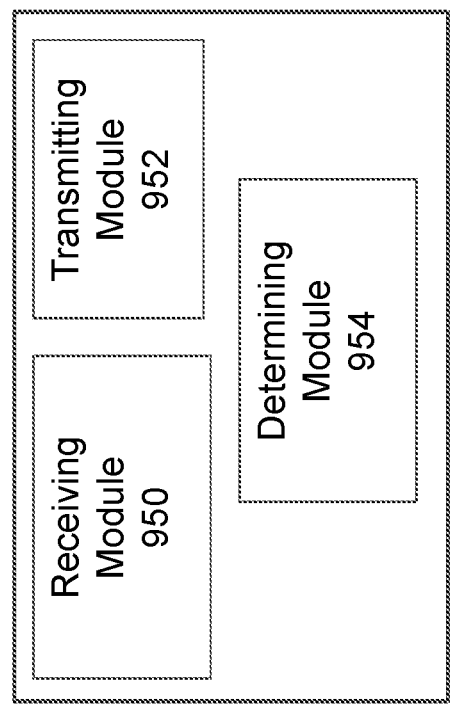
FIG. 21B is a block diagram illustrating example components of a network node.
Figure 21A:
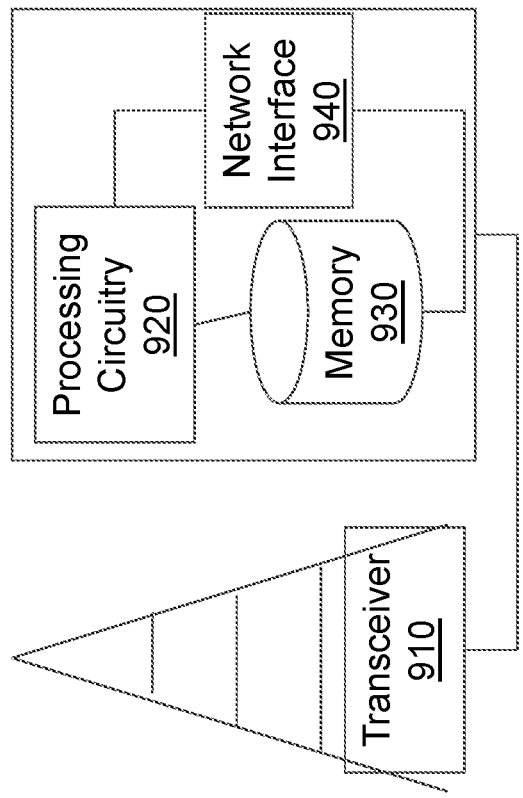
FIG. 21A is a block diagram illustrating an example embodiment of a network node.

FIG. 21A is a block diagram illustrating an example embodiment of a network node. The network node is capable of performing a handover from a first cell to a second cell where a QoS flow to DRB mapping for the second cell may be different than a QoS flow to DRB mapping for the first cell. The network node is capable of: receiving a handover request from a source network node; receiving, from the source network node, a QoS flow to DRB mapping that was used by the source network node prior to the handover; receiving buffered PDCP PDUs from the source network node; transmitting the received PDCP PDUs using the received QoS flow to DRB mapping; obtaining an indication that handover is complete; determining a new QoS flow to DRB mapping; and activating the new QoS flow to DRB mapping for transmission of PDCP PDUs.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. Network node 120 includes processing circuitry 920 (e.g., CPUs, ASICs, FPGAs, etc.), at least one memory 930, at least one network interface 940, and one or more radio units that each include on or more transceivers 910 coupled to one or more antennas. Transceiver 910 facilitates transmitting wireless signals to and receiving wireless signals from a wireless device, such as wireless devices 110 (e.g., via an antenna); processing circuitry 920 executes instructions to provide some or all of the functionality described above as being provided by a network node 120; memory 930 stores the instructions executed by processing circuitry 920; and network interface 940 communicates signals to backend network components, such as a gateway, switch, router, Internet, Public Switched Telephone Network (PSTN), controller, and/or other network nodes 120. Processing circuitry 920 and memory 930 can be of the same types as described with respect to processing circuitry 820 and memory 830 of FIG. 20 above.

In some embodiments, network interface 940 is communicatively coupled to processing circuitry 920 and refers to any suitable device operable to receive input for network node 120, send output from network node 120, perform suitable processing of the input or output or both, communicate to other devices, or any combination of the preceding. Network interface 940 includes appropriate hardware (e.g., port, modem, network interface card, etc.) and software, including protocol conversion and data processing capabilities, to communicate through a network. In particular embodiments, processing circuitry 920 in communication with transceiver 910 communicates PDCP encapsulated data with wireless device 110.

In some embodiments, a portion of the network node 120 may be implemented as virtual component(s) (e.g., via a virtual machine(s) executing on a physical processing node(s) in a network(s)). For example, some or all of the functions executed by processing circuitry 920 of network node 120 are implemented as virtual components executed by one or more virtual machines implemented in a virtual environment(s) hosted by processing circuitry 920.

Other embodiments of network node 120 include additional components (beyond those shown in FIG. 21A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

FIG. 21B is a block diagram illustrating example components of a network node 120. The components may include receiving module 950, transmitting module 952, and determining module 954.

Receiving module 950 may perform the receiving functions of network node 120. For example, receiving module 950 may perform the steps 1912-1916, 1920 and 1928 of FIG. 19. In certain embodiments, receiving module 950 may include or be included in processing circuitry 920. Receiving module 950 may communicate with transmitting module 952 and determining module 954.

Transmitting module 952 may perform the transmitting functions of network node 120. For example, transmitting module 952 may perform steps 1918 and 1926 of FIG. 19. In certain embodiments, transmitting module 952 may include or be included in processing circuitry 920. Transmitting module 952 may communicate with receiving module 950 and determining module 954.

Determining module 954 may perform the determining functions of network node 120. For example, determining module 954 may perform steps 1922 and 1924 of FIG. 19. In certain embodiments, determining module 954 may include or be included in processing circuitry 920. Determining module 954 may communicate with receiving module 950 and transmitting module 952.

Some embodiments of the disclosure may provide one or more technical advantages. Some embodiments may benefit from some, none, or all of these advantages. Other technical advantages may be readily ascertained by one of ordinary skill in the art.

Although this disclosure has been described in terms of certain embodiments, alterations and permutations of the embodiments will be apparent to those skilled in the art. Although some embodiments have been described with reference to certain radio access technologies, any suitable radio access technology (RAT) or combination of radio access technologies may be used, such as long term evolution (LTE), LTE-Advanced, NR, UMTS, HSPA, GSM, cdma2000, WiMax, WiFi, etc. Accordingly, the above description of the embodiments does not constrain this disclosure. Other changes, substitutions, and alterations are possible without departing from the spirit and scope of this disclosure.

ABBREVIATIONS

3GPP 3rd Generation Partnership Project
5GC Fifth Generation System
5GC Fifth Generation Core
AMBR Aggregate Maximum Bit Rate
AMF Authentication and Management Function
AS Access Stratum
CA Carrier Aggregation
CC Component Carrier
CN Core Network
DRB Data Radio Bearer
eMBB enhanced Mobile BroadBand
eMTC enhanced Machine Type Communications
eMTC-U enhanced Machine Type Communications for Unlicensed Band
eNB Evolved Node B
eNodeB Evolved Node B
EPC Evolved Packet Core
EPS Evolved Packet System
FeMTC Further enhanced MTC
FDD Frequency Division Duplex
FMS First Missing PDCP SN
GBR Guaranteed Bit Rate
gNB Fifth Generation Node B
HFN Hyper Frame Number
ID Identifier
IoT Internet of Things
LTE Long-Term Evolution
MBR Maximum Bit Rate
MME Mobility Management Entity
MSC Mobile Switching Center
MTC Machine Type Communication
NAS Non Access Stratum
NB-IoT NarrowBand-IoT
NB-IoT-U Narrow-band Internet of Things for Unlicensed Band
NGS Next Generation System
NR New Radio
NW Network
OFDM Orthogonal Frequency Division Multiplexing
PBCH Physical Broadcast Channel
PCC Primary Component Carrier
PCell Primary Cell
PCRF Policy and Charging Rules Function
PDCP Packet Data Convergence Protocol
PDN Packet Data Network
PDU Protocol Data Unit
PGW Packet Data Network Gateway
QoS Quality of Service
RAB Radio Access Bearer
RAT Radio Access Technology
RAN Radio Access Network
RF Radio Frequency
RLF Radio Link Failure
RRC Radio Resource Control
RSRP Reference Signal Received Power
RSRQ Reference Signal Received Quality
RSTD Reference Signal Time Difference
SCC Secondary Component Carrier
SCell Secondary Cell
SDF Service Data Flow
SDU Service Data Unit
SFN System Frame Number
SGW Serving Gateway
SLA Service Level Agreement
TDD Time Division Duplex
TDOA Time Difference Of Arrival
TOA Time Of Arrival
UE User Equipment
UMTS Universal Mobile Telecommunications System
UTDOA Uplink Time Difference of Arrival
UTRA UMTS Terrestrial Radio Access

The invention claimed is:

1. A method for use in a network node of performing handover of a wireless device, the method comprising:
receiving a handover request from a source network node;
receiving, from the source network node, a quality of service (QoS) flow to data radio bearer (DRB) mapping that was used by the source network node prior to handover;
receiving buffered Packet Data Convergence Protocol (PDCP) protocol data units (PDUs) from the source network node;
transmitting the received PDCP PDUs using the received QoS flow to DRB mapping, the PDCP PDUs comprising a first sequence number associated with the QoS flow to DRB mapping used by the source network node and a second sequence number associated with a new QoS flow to DRB mapping used by the network node, the first sequence number different than the second sequence number;
obtaining an indication that handover is complete;
determining a new QoS flow to DRB mapping; and
activating the new QoS flow to DRB mapping for transmission of PDCP PDUs.

2. The method of claim 1, wherein receiving the QoS flow to DRB mapping from the source network node comprises receiving handover signaling on an Xn interface.

3. The method of claim 1, wherein receiving the QoS flow to DRB mapping from the source network node comprises receiving handover signaling via a core network element on an S1 or NG interface.

4. The method of claim 1, further comprising sending the new QoS flow to DRB mapping to the source network node.

5. The method of claim 4, further comprising receiving PDCP status reporting from a wireless device.

6. The method of claim 5, wherein the new QoS flow to DRB mapping for transmission of PDCP PDUs is activated after synchronization of the received buffered PDCP PDUs is complete.

7. The method of claim 1, wherein the received QoS flow to DRB mapping comprises a subset of DRBs in use at the network node or at the source network node.

8. A network node capable of performing handover of a wireless device, the network node comprising:
 a network interface configured to:
  receive a handover request from a source network node;
  receive, from the source network node, a quality of service (QoS) flow to data radio bearer (DRB) mapping that was used by the source network node prior to handover;
  receive buffered Packet Data Convergence Protocol (PDCP) protocol data units (PDUs) from the source network node; and
  transmit the received PDCP PDUs using the received QoS flow to DRB mapping, the PDCP PDUs comprising a first sequence number associated with the QoS flow to DRB mapping used by the source network node and a second sequence number associated with a new QoS flow to DRB mapping used by the network node, the first sequence number different than the second sequence number; and
 processing circuitry configured to:
  obtain an indication that handover is complete;
  determine a new QoS flow to DRB mapping; and
  activate the new QoS flow to DRB mapping for transmission of PDCP PDUs.

9. The network node of claim 8, wherein the network interface is operable to receive the QoS flow to DRB mapping from the source network node by receiving handover signaling on an Xn interface.

10. The network node of claim 8, wherein the network interface is operable to receive the QoS flow to DRB mapping from the source network node by receiving handover signaling via a core network element on an S1 or NG interface.

11. The network node of claim 8, the network interface is further operable to send the new QoS flow to DRB mapping to the source network node.

12. The network node of claim 11, the network interface is further operable to receive PDCP status reporting from a wireless device.

13. The network node of claim 11, wherein the processing circuitry is operable to activate the new QoS flow to DRB mapping for transmission of PDCP PDUs after synchronization of the received buffered PDCP PDUs is complete.

14. The network node of claim 8, wherein the received QoS flow to DRB mapping comprises a subset of DRBs in use at the network node or at the source network node.

* * * * *